US012793573B2

(12) United States Patent
Kim et al.

(10) Patent No.: US 12,793,573 B2
(45) Date of Patent: Nov. 10, 2026

(54) BOARDING INFORMATION GUIDING SYSTEM AND METHOD, AND PROCEDURE MANAGEMENT DEVICE AND METHOD

(71) Applicant: DOT INCORPORATION, Seoul (KR)

(72) Inventors: Ju Yoon Kim, Incheon (KR); Ji Ho Kim, Gimpo-si (KR); Hyeon Cheol Park, Gwangmyeong-si (KR)

(73) Assignee: DOT INCORPORATION, Seoul (KR)

( * ) Notice: Subject to any disclaimer, the term of this patent is extended or adjusted under 35 U.S.C. 154(b) by 0 days.

(21) Appl. No.: 19/232,899

(22) Filed: Jun. 10, 2025

(65) Prior Publication Data

US 2025/0308408 A1 Oct. 2, 2025

Related U.S. Application Data

(63) Continuation of application No. 17/732,988, filed on Apr. 29, 2022, now Pat. No. 12,347,333, which is a continuation-in-part of application No. 16/343,151, filed as application No. PCT/KR2017/011733 on Oct. 23, 2017, now abandoned.

(30) Foreign Application Priority Data

Oct. 21, 2016 (KR) ........................ 10-2016-0137697
Oct. 25, 2016 (KR) ........................ 10-2016-0139286

(51) Int. Cl.
*G01C 21/36* (2006.01)
*G09B 21/00* (2006.01)

(52) U.S. Cl.
CPC ....... *G09B 21/003* (2013.01); *G01C 21/3652* (2013.01); *G01C 21/3655* (2013.01)

(58) Field of Classification Search
None
See application file for complete search history.

(56) References Cited

U.S. PATENT DOCUMENTS

| | | | |
|---|---|---|---|
| 4,815,014 A | 3/1989 | Lipner et al. | |
| 6,484,093 B1 | 11/2002 | Ito et al. | |
| 9,581,455 B2 * | 2/2017 | Lord | G01C 21/3423 |
| 9,829,322 B2 | 11/2017 | Lee | |
| 2005/0188219 A1 | 8/2005 | Annic et al. | |
| 2012/0092191 A1 | 4/2012 | Stefik et al. | |
| 2014/0344375 A1 | 11/2014 | Hauser et al. | |
| 2016/0189435 A1 | 6/2016 | Beaurepaire | |
| 2019/0090083 A1 | 3/2019 | Kitagishi et al. | |
| 2019/0103028 A1 | 4/2019 | Kobayashi et al. | |
| 2020/0192385 A1 | 6/2020 | Fairfield et al. | |

FOREIGN PATENT DOCUMENTS

| | | |
|---|---|---|
| CN | 101183011 A | 5/2008 |
| CN | 103994769 A | 8/2014 |
| CN | 104121908 A | 10/2014 |

(Continued)

*Primary Examiner* — Todd Melton
(74) *Attorney, Agent, or Firm* — NKL LAW; Jae Youn Kim

(57) ABSTRACT

Provided is a procedure managing device and method, and more particularly, to a procedure managing device and method that generates and provides personalized guide data and instruction data by considering the individual situation or state of each user in response to a target signal received from each user terminal.

12 Claims, 15 Drawing Sheets

(56) References Cited

FOREIGN PATENT DOCUMENTS

| | | | |
|---|---|---|---|
| JP | H07234996 | A | 9/1995 |
| JP | 2001-147132 | A | 5/2001 |
| JP | 2002-277278 | A | 9/2002 |
| JP | 2003288392 | A | 10/2003 |
| JP | 2006337066 | A | 12/2006 |
| JP | 2008032744 | A | 2/2008 |
| JP | 10-2008-0049423 | A | 6/2008 |
| KR | 10-2002-0045678 | A | 6/2002 |
| KR | 10-2005-0056307 | A | 6/2005 |
| KR | 10-2011-0116807 | A | 10/2011 |
| KR | 10-2013-0027639 | A | 3/2013 |
| KR | 10-2013-0088568 | A | 8/2013 |
| KR | 10-2013-0115042 | A | 10/2013 |
| KR | 10-2014-0133649 | A | 11/2014 |
| KR | 10-2015-0097043 | A | 8/2015 |
| KR | 10-2015-0101433 | A | 9/2015 |
| KR | 10-2016-0001008 | A | 1/2016 |
| KR | 10-1591451 | B1 | 2/2016 |
| KR | 10-1621891 | B1 | 5/2016 |
| WO | 2013/027956 | A1 | 2/2013 |

* cited by examiner

BOARDING INFORMATION GUIDING SYSTEM AND METHOD, AND PROCEDURE MANAGEMENT DEVICE AND METHOD

TECHNICAL FIELD

The present disclosure relates to a boarding information guiding system and method, and more particularly, to a method and system that determines a boarding position for a boarding wish bus of a user, provides the determined boarding position to a user terminal, and provides a stop position corresponding to the boarding position to a bus terminal, thereby informing a bus boarding position by using non-visual information. The present disclosure relates to a procedure managing device and method, and more particularly, to a procedure managing device and method that generates and provides personalized guide data and instruction data by considering not only the individual situation or state of each user but also the individual situations or states of other users, that is, by overall considering the states of all registered users.

BACKGROUND ART

Recently, the remarkable development of smart devices such as smart phones, smart watches, and smart glasses has provided convenient environments for the public in everyday life. However, because most smart devices are based on a graphical user interface (GUI), the blind have difficulty in detecting a mouse pointer or a touch position and thus have difficulty in using such smart devices. Thus, in order for the blind to use such smart devices, it is necessary to provide a user environment for transmitting information by using sound or tactile sense. In general, because a bus stops in a bus station on the road surface to pick up passengers and stops in an available space around a bus station (not at a given position as in the subway) to pick up passengers, the blind may have difficulty in detecting a bus stop position. In this regard, Korean Patent Application No. 2013-0027639 discloses a configuration of providing bus arrival guide information as an auditory signal; however, this merely informs the number of a bus to arrive soon and thus it may be difficult to provide information about where the blind should board the bus.

With the development of electronic communication technology, a user may use various functions by using a mobile terminal. The mobile terminal may install and delete various applications as desired by the user and may directly access the Internet by using the wireless Internet and thus its utilization is high. The mobile terminal may include sensors such as acceleration sensors, proximity sensors, and temperature sensors, may perform a function of detecting an environment around the user, and may provide information related to the detected environment to the user.

RELATED ART DOCUMENT

Patent Document (Patent Document 1) National Patent Application Publication No. 2005-0056307

Information disclosed in this Background section was already known to the inventors before achieving the present disclosure or is technical information acquired in the process of achieving the present disclosure. Therefore, it may contain information that does not form the prior art that is already known to the public.

DESCRIPTION OF EMBODIMENTS

Technical Problem

The present disclosure provides determining a boarding position for a boarding wish bus of a user, providing the determined boarding position to a user terminal, and providing a stop position corresponding to the boarding position to a bus terminal, thereby informing the user of a bus boarding target position in a non-visual manner and informing a bus driver of a bus stop target position for picking up the user.

The present disclosure may provide a procedure managing device and method that generates and provides personalized guide data and instruction data by considering the individual situation or state of each user in response to a target signal received from each user terminal.

Solution to Problem

According to an aspect of the present disclosure, a boarding information guiding system includes: a bus information acquiring unit receiving a bus information signal from a bus terminal installed in at least one bus to acquire bus service information about each of the at least one bus; a user terminal detecting unit detecting that a user terminal approaches a bus station; a boarding bus determining unit receiving boarding wish information from the approached user terminal and matching the boarding wish information with the bus service information to determine a boarding bus; a boarding position providing unit determining a boarding position of the boarding bus and providing a signal for guiding the boarding position to the user terminal; and a stop position providing unit determining a stop position corresponding to the determined boarding position and providing a signal for guiding the stop position to a bus terminal of the boarding bus.

The boarding bus determining unit may match a bus number of the boarding wish information with a bus number of the bus service information to determine a bus having a current position closest to the bus station among buses having a matching bus number, as a boarding bus.

The boarding bus determining unit may match a bus number of the boarding wish information with a bus number of the bus service information to determine a bus having an earliest scheduled arrival time to the bus station among buses having a matching bus number, as a boarding bus.

When there is at least one preset stop position in the bus station, the boarding position providing unit may determine one of the at least one preset stop position as the boarding position based on a position of the user terminal.

The boarding information guiding system may further include an arrival time calculating unit calculating an expected time for the boarding bus to stop at the stop position and providing the calculated expected time to the user terminal.

The boarding information guiding system may further include a mis-boarding notifying unit providing a mis-boarding notification signal to the user terminal when the bus terminal and the user terminal are within a preset distance and a bus number of the boarding wish information does not match a bus number of a bus where the bus terminal is installed.

The boarding position providing unit may determine whether the boarding bus is in a situation of failing to stop at the stop position, determine a modified boarding position by analyzing a position where the boarding bus is able to stop, and provide a signal for guiding the modified boarding position to the user terminal.

When the boarding bus fails to stop at the boarding position, the boarding position providing unit may determine a position where the boarding bus has actually stopped, as a modified boarding position and provide a signal for guiding the modified boarding position to the user terminal.

The boarding position providing unit may determine a current position of the user terminal as the boarding position.

The boarding bus determining unit may acquire destination information included in the boarding wish information and determine the boarding bus among buses having bus service information corresponding to the destination information.

After the signal for guiding the boarding position is provided to the user terminal, before the boarding bus stops at the stop position, the stop position providing unit may provide a stop restriction zone based on the stop position to a bus terminal of at least one other bus scheduled to stop at the bus station.

The bus information may include a current position and a bus number of a bus where the bus terminal is installed.

The user terminal may include: an input unit capable of receiving a boarding wish bus from a user; and an output unit outputting a tactile signal capable of guiding the user to the boarding position, based on the signal for guiding the boarding position.

The user terminal may include two separate devices communicating with each other, and the input unit and the output unit may be implemented in different devices.

According to another aspect of the present disclosure, a boarding information guiding method includes: receiving a bus information signal from a bus terminal installed in at least one bus to acquire bus service information about each of the at least one bus; detecting that a user terminal approaches a bus station; receiving boarding wish information from the approached user terminal and matching the boarding wish information with the bus service information to determine a boarding bus; determining a boarding position of the boarding bus and providing a signal for guiding the boarding position to the user terminal; and determining a stop position corresponding to the determined boarding position and providing a signal for guiding the stop position to a bus terminal of the boarding bus.

According to another aspect of the present disclosure, a procedure managing method includes: receiving, by a procedure managing device, a target signal from a user terminal; generating guide data corresponding to a target position extracted by analyzing the target signal; generating at least one piece of instruction data by considering a position of the user terminal, a preference condition of a user, and guide data; reading state information stored in the user terminal and analyzing the state information to extract first instruction data corresponding to an operation to be performed at a current time; transmitting the first instruction data to a first transmitting device corresponding to the first instruction data and waiting for a response signal from the first transmitting device; and when a response signal is received from the first transmitting device, extracting second instruction data corresponding to a subsequent operation of the first instruction data and transmitting the second instruction data to a second transmitting device corresponding to the second instruction data.

The procedure managing method may further include terminating guide data corresponding to the target signal when a response signal is received from the second transmitting device and a distance between a position of the second transmitting device and a target position of the target signal is within a preset threshold distance.

When failing to read state information from the user terminal, the extracting of the first instruction data may analyze a position of the user terminal or a latest response signal received in response to a target signal of the user terminal, to extract first instruction data corresponding to an operation to be performed at a current time.

When failing to receive the response signal within a preset threshold time from a time of transmitting the first instruction data, the waiting for the response signal from the first transmitting device may transmit the first instruction data to the first transmitting device and the user terminal and wait for a response signal from the first transmitting device.

The response signal may be generated by the first transmitting device according to detection of approach to a user terminal extracted by the first instruction data.

According to another aspect of the present disclosure, a procedure managing method includes: receiving, by a procedure managing device, a target signal from a user terminal; generating guide data corresponding to a target position extracted by analyzing the target signal; generating at least one piece of instruction data by considering a position of the user terminal, a preference condition of a user, and guide data; reading state information stored in the user terminal and analyzing the state information to extract first instruction data corresponding to an operation to be performed at a current time; transmitting the first instruction data to the user terminal and waiting for a response signal from the user terminal; and when a response signal is received from the user terminal, extracting second instruction data corresponding to a subsequent operation of the first instruction data and transmitting the second instruction data to the user terminal.

According to another aspect of the present disclosure, a procedure managing device includes: a target signal receiving unit receiving at least one target signal from at least one user terminal; a guide data generating unit generating guide data corresponding to a target position extracted by analyzing the at least one target signal; and an instruction data generating unit generating instruction data corresponding to an operation to be performed at a current time, by considering a position of each user terminal, a preference condition of each user, and guide data for each user, and transmitting instruction data to each user terminal or a transmitting device corresponding to the instruction data.

The procedure managing device may further include a state managing unit managing state information of each user and updating state information of the user when a response to the instruction data is received from the transmitting device or the user terminal.

When a response signal to the instruction data is received from the transmitting device, the state managing unit may update the state information of the user through the response signal received from the transmitting device, and when a response signal to the instruction data is received from the user terminal, the state managing unit may update the state information of the user through the response signal received from the user terminal.

Advantageous Effects of Disclosure

According to the present disclosure, the bus boarding position may be easily notified even to a user having difficulty in using visual information.

The procedure managing device and method according to embodiments of the disclosure may generate and provide the personalized guide data and instruction data by considering the individual situation or state of each user in response to the target signal received from each user terminal.

BEST MODE

Figure 1:
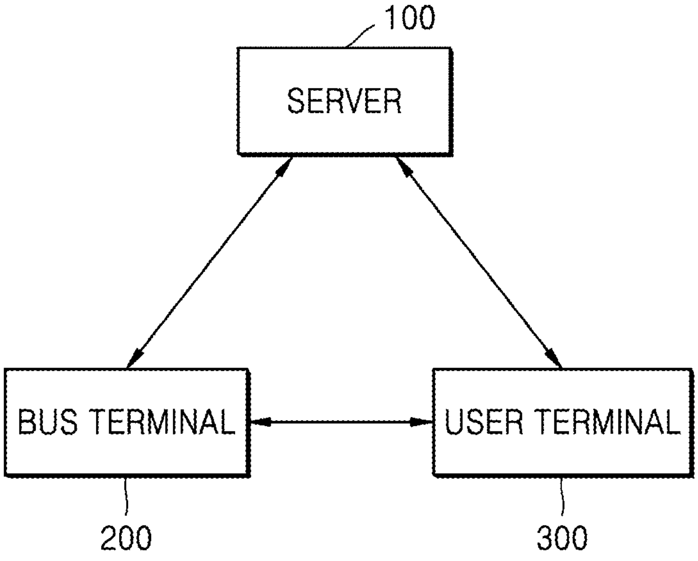
FIG. 1 is a diagram illustrating a configuration of a boarding information guiding system according to an embodiment of the present disclosure.

The following detailed description of the present disclosure refers to the accompanying drawings that illustrate particular embodiments of the present disclosure. The embodiments are described in sufficient detail to enable those of ordinary skill in the art to implement the present disclosure. It will be understood that various embodiments of the present disclosure are not necessarily mutually exclusive while being different from each other. For example, particular shapes, structures, and features described herein may be modified from some embodiments to other embodiments without departing from the spirit and scope of the present disclosure. Also, it will be understood that the position or arrangement of individual components in each embodiment may be modified without departing from the spirit and scope of the present disclosure. Thus, the following detailed description should be considered in a descriptive sense only and not for purposes of limitation, and the scope of the present disclosure should be construed as including the appended claims and all equivalents thereof. In the drawings, like reference numerals will denote like elements throughout various aspects.

Hereinafter, various embodiments of the present disclosure will be described in detail with reference to the accompanying drawings so that those of ordinary skill in the art may easily implement the present disclosure.

FIG. 1 is a diagram illustrating a configuration of a boarding information guiding system according to an embodiment of the present disclosure.

Referring to FIG. 1, the boarding information guiding system according to an embodiment of the present disclosure may include at least one bus terminal 200, a user terminal 300, a server 100 communicating with the bus terminal 200 and the user terminal 300 to provide a boarding position to the user terminal 300 and provide a stop position to the bus terminal 200, and a communication network (not illustrated) enabling communication between the bus terminal 200, the user terminal 300, and the server 100.

In general, because a bus stops in a bus station on the road surface to pick up passengers and stops in an available space around a bus station (not at a given position as in the subway) to pick up passengers, the blind may have difficulty in detecting a bus stop position. Some bus stations provide bus arrival guide information as auditory signals; however, this merely informs the number of a bus to arrive soon and thus it may be difficult to provide information about where the blind should board the bus. Particularly, when several buses arrive at the same time, it may be difficult to distinguish the stopped buses and thus the blind may have to ask for nearby help in order to board a desired bus. For this reason, the blind may often use the subway rather than buses. However, the blind may have difficulty in moving underground or overground in order to use the subway.

In order to solve the above limitations, the server 100 of the boarding information guiding system according to an embodiment of the present disclosure may acquire bus information from the bus terminals 200, detect the approach of the user terminal 300 to receive boarding wish information, match the boarding wish information with bus information to determine a boarding bus, determine a boarding position of the boarding bus, and guide the boarding position as a stop position of the bus, thus allowing the blind to board the bus even without help from others. Each configuration of the server 100 will be described below in more detail.

Figure 2:
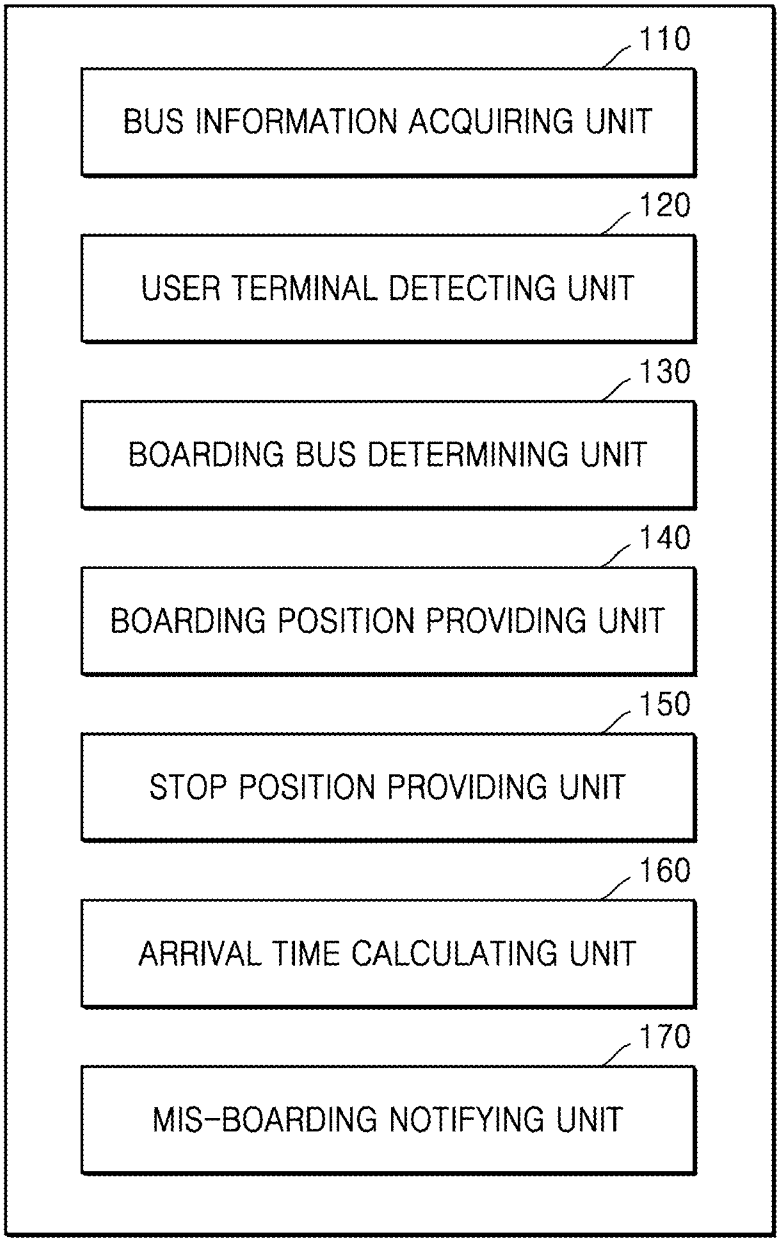
FIG. 2 is a diagram illustrating a configuration of a server according to an embodiment of the present disclosure.

FIG. 2 is a diagram illustrating a configuration of a server 100 according to an embodiment of the present disclosure.

The server 100 according to an embodiment of the present disclosure may include a bus information acquiring unit 110, a user terminal detecting unit 120, a boarding bus determining unit 130, a boarding position providing unit 140, and a stop position providing unit 150.

First, the bus information acquiring unit 110 may receive a bus information signal from the bus terminal 200 installed in at least one bus, to acquire bus service information about each bus. In this case, the bus service information may include at least one of a vehicle number, a bus number, a current position, and a distance from a following/preceding car.

Meanwhile, according to an embodiment of the present disclosure, the bus terminal 200 may be a terminal installed inside or outside a bus and may store and process information about the bus, such as the vehicle number, the bus number, the current position, and the distance from the following/preceding car, and generate a bus information signal therefrom. Also, according to an embodiment of the present disclosure, the bus terminal 200 may output a stop position of the bus station received from the server 100, and there is no limit to a format and method of outputting the stop position. According to an embodiment of the present disclosure, for recognition by a bus driver, the bus terminal 200 may output information indicating that a blind person is to board at the bus station and the bus should be stopped at a designated stop position to pick up the blind person.

Next, the user terminal detecting unit 120 may detect that the user terminal 300 approaches the bus station. In this case, the user terminal 300 may be a computing device carried by a user and may include an input unit for receiving a boarding wish bus from the user and an output unit for outputting a tactile signal to the user. A detailed example of the user terminal 300 will be described below with reference to FIGS. 5A-5D.

The user terminal detecting unit 120 may receive a signal from the user terminal 300 to detect the position of the user terminal 300 and then detect that the user terminal 300 approaches the bus station. Alternatively, the user terminal detecting unit 120 may receive a signal from a detection terminal, which is installed at the bus station to detect the approach of the user terminal 300, to detect the approach of the user terminal 300.

As described above, the present disclosure is to non-visually notify the boarding position of the bus to the user who has arrived at the bus station or is located near the bus station. For this purpose, first, it may be necessary to recognize that the user has arrived at the bus station or is located near the bus station. The user terminal detecting unit 120 may detect that the user terminal 300 has approached the bus station, based on the recognition of the user terminal 300 by the server 100 or the detection terminal. In this case, a spatial range of the bus station may be a line having a certain length or a space having a certain area, not a point. Thus, the user terminal detecting unit 120 may detect the user terminal 300 that is within a spatial range of the bus station or is spaced apart within a certain distance from the boundary of the spatial range, to detect that the user terminal 300 approaches the bus station.

Next, the boarding bus determining unit 130 may receive boarding wish information from the approached user terminal 300 and match the boarding wish information with the bus service information to determine a boarding bus. More particularly, according to an embodiment of the present disclosure, the user may input his/her boarding wish information to the user terminal 300. The boarding wish information may include at least one of information of the user terminal 300, a boarding intention, a bus number, and a destination. In this case, a method of inputting the boarding wish information to the user terminal 300 by the user may be used without limitation, such as oral input and keyboard input. When the user terminal 300 has approached the bus station and the boarding wish information is input to the user terminal 300, the boarding bus determining unit 130 may determine that the user intends to board the bus, and match the boarding wish information with the bus service information collected from the bus terminal 200.

In an alternative embodiment, the boarding bus determining unit 130 may match the bus number of the boarding wish information with the bus number of the bus service information to determine the bus closest to the bus station among the buses having the matching bus number, as the boarding bus. As described above, the bus service information may include information about the current position. In general, because the bus, which may arrive at the bus station first among the buses having the same bus number, may be the bus having a current position closest to the bus station, the boarding bus determining unit 130 may designate the bus located closest to the bus station, as the boarding bus.

In an alternative embodiment, the boarding bus determining unit 130 may match the bus number of the boarding wish information with the bus number of the bus service information to determine the bus having the earliest scheduled arrival time to the bus station among the buses having the matching bus number, as the boarding bus. The server 100 according to an embodiment of the present disclosure may calculate the scheduled arrival time at which the bus arrives at the bus station, based on the current position of the bus by considering the traffic situation. Thus, the boarding bus determining unit 130 may determine the bus having the earliest scheduled arrival time as the boarding bus, thereby reducing the waiting time of a boarding wisher.

In an alternative embodiment, the boarding bus determining unit 130 may acquire destination information included in the boarding wish information and determine the boarding bus among the buses having the bus service information corresponding to the destination information. More particularly, according to an embodiment of the present disclosure, the boarding wish information may include information about a destination to which the user wishes to go, instead of the number of the bus on which the user wishes to board. In this case, the boarding bus determining unit 130 may determine the boarding bus among the buses stopping at the destination, in response to the destination information included in the boarding wish bus. The boarding bus determining unit 130 may determine, as the boarding bus, the bus having a current position closest to the bus station or the bus having the earliest scheduled arrival time to the bus station among the buses stopping at the destination.

Next, the boarding position providing unit 140 may determine a boarding position of the boarding bus and provide a signal for guiding the boarding position to the user terminal 300. More particularly, the boarding position may be determined by synthetically considering the position of the user, the spatial range of the bus station, the physical characteristics of the bus station, the situation of the bus station, the arrived buses, and the buses scheduled to arrive. The boarding position may be determined to be within the spatial range of the bus station, but may be determined to be spaced apart within a certain distance from the spatial range of the bus station by considering congestion.

In an alternative embodiment, the boarding position providing unit 140 may determine the boarding position by considering the current situation of the bus station. For example, a structure such as a trash can or a bus sign that may obstruct boarding may be installed on the bus station. Also, other buses may have already stopped at the bus station. In this case, for easy boarding of the user, the boarding position may be provided to avoid the structure or the buses that have already stopped. Thus, the boarding position providing unit 140 may determine a point at which the user may easily board the bus, as the bus boarding position, by considering the current situation of the bus station.

Figure 3:
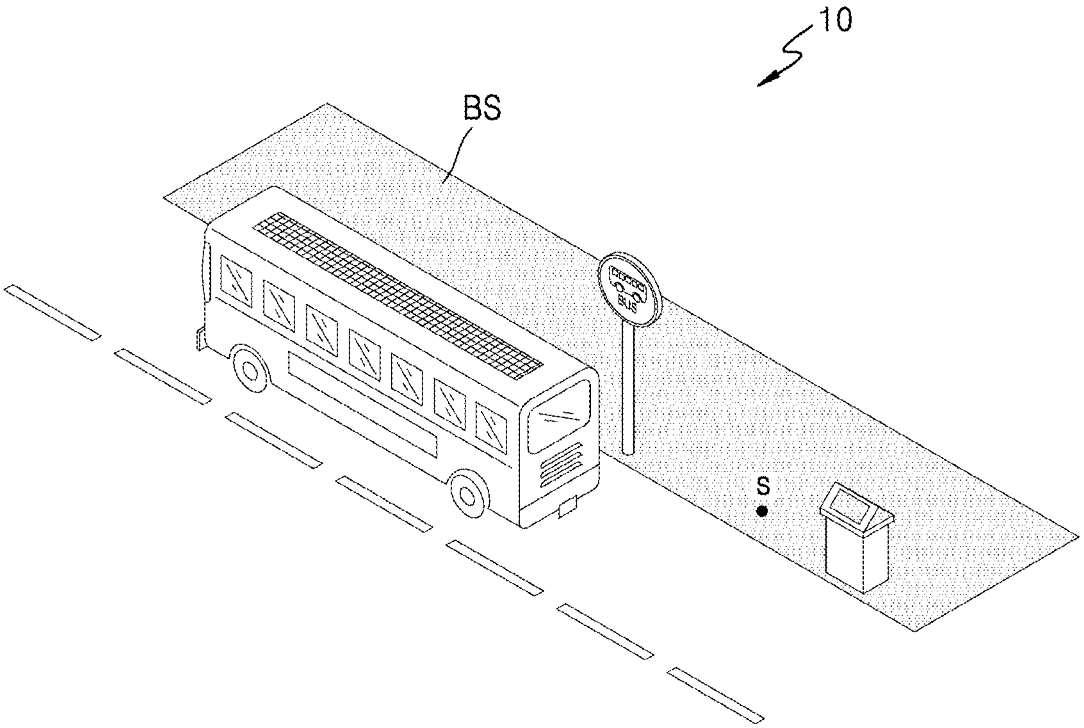
FIG. 3 is a diagram illustrating an example in which a user's boarding position is determined in a bus station according to an embodiment of the present disclosure.

FIG. 3 is a diagram illustrating an example in which a user's boarding position is determined in a bus station according to an embodiment of the present disclosure.

Referring to FIG. 3, a structure such as a trash can or a bus guide sign may exist in a spatial range BS of a bus station, and there may be a bus that has already stopped at the bus station. In this case, the easiest boarding position may be a position where there is no structure and no stopped bus. Thus, the boarding position providing unit 140 according to an embodiment of the present disclosure may determine such a position "s" as the boarding position.

In an alternative embodiment, there may be at least one preset stop position in the bus station. Some bus stations with many types of stopping buses may have a preset stop position for each bus number. In this case, the boarding position providing unit 140 may determine, as the boarding position, a preset stop position corresponding to the bus number of the boarding wish bus.

In an alternative embodiment, when the boarding bus fails to stop at the boarding position, the boarding position providing unit 140 may determine whether the boarding bus is in a situation of failing to stop at the stop position, determine a modified boarding position by analyzing an available stop position of the boarding bus, and transmit the modified boarding position to the user terminal 300. More particularly, when another bus stops at a designated boarding position before the boarding bus, the boarding bus arriving later may be unable to stop at the boarding position. In this case, the boarding position providing unit 140 may determine a modified boarding position (e.g., a position behind the current stopped bus) by analyzing other boarding positions and transmit a signal for guiding the modified boarding position to the user terminal 300.

In an alternative embodiment, when the boarding bus has already failed to stop at the boarding position, the boarding position providing unit 140 may determine, as a modified boarding position, a position at which the boarding bus actually stops and provide a signal for guiding the modified boarding position to the user terminal 300. More particularly, when the boarding bus has failed to stop at a designated stop position, has stopped at another position, and has difficulty in moving to another stop position, the boarding position providing unit 140 may determine the current position of the boarding bus as a modified boarding position such that the user may stably board the boarding bus even when an unexpected event occurs.

In an alternative embodiment, the boarding position providing unit 140 may designate the current position of the user terminal 300 as the boarding position. That is, when the user terminal 300 according to an embodiment of the present disclosure is located in or near the bus station and its position is a position where the boarding bus may stop, the current position of the user terminal 300 may be designated as the boarding position for convenience of the user.

Next, the stop position providing unit 150 may determine a stop position corresponding to the determined boarding position and transmit a signal for guiding the stop position to the bus terminal 200 of the boarding bus. As described above, according to an embodiment of the present disclosure, the boarding position of the user may be determined in consideration of various conditions and then transmitted to the user terminal 300, and a signal for designating the stop position may be provided to the bus terminal 200 of the boarding bus such that the boarding bus may stop at the stop position corresponding to the boarding position. In the case of the bus of the bus terminal 200 that has been notified of the stop position, because a driver thereof may see the notification of the bus terminal 200 and stop at the stop position for picking up the user, even the blind may easily board the boarding wish bus.

Also, after the signal for guiding the boarding position is provided to the user terminal 300, before the boarding bus stops at the stop position, the stop position providing unit 150 may provide a stop restriction region based on the stop position to the bus terminal 200 of at least one bus that may possibly stop at the bus station. That is, in order for the boarding bus to stop at a given boarding position, it may be necessary to restrict the stopping of other buses. Thus, the stop position providing unit 150 according to an embodiment of the present disclosure may designate a region within a certain radius from a given boarding position as a stop restriction region of the buses arriving before the arrival of the boarding bus.

Next, an arrival time calculating unit 160 may calculate an expected time at which the boarding bus stops at the stop position and provide the calculated expected time to the user terminal 300. More particularly, because the current position of the bus may be known from the acquired bus service information, an expected time at which the boarding bus arrives at the boarding position may be calculated in consideration of the traffic situation. According to an embodiment of the present disclosure, when the calculated expected time is provided to the user terminal 300, the user terminal 300 may output the expected time as a tactile signal, thereby allowing the user to know the arrival time of the boarding bus.

Next, when the bus terminal 200 and the user terminal 300 are within a preset distance and the number of the bus where the bus terminal 200 is installed does not match the number of the boarding wish bus, a mis-boarding notifying unit 170 may provide a mis-boarding notification signal to the user terminal 300.

More particularly, even when the boarding position is provided according to an embodiment of the present disclosure, there may be a possibility that the user will board a wrong bus that is not the boarding wish bus. When the user boards the bus, because the distance between the user terminal 300 and the bus terminal 200 will decrease, the mis-boarding notifying unit 170 may determine whether the distance between the user terminal 300 and the bus terminal 200 of the bus that is not the boarding wish bus decreases by a reference value or more and provide a mis-boarding notification signal to the user terminal 300 when determining that the user has mis-boarded the bus, so that the user may recognize that the user has mis-boarded the bus.

In the above way, the server 100 may provide the boarding position to the user terminal 300 and provide the stop position corresponding to the boarding position to the bus terminal 200, so that the user may easily board the boarding wish bus and the bus driver may easily pick up the blind person.

Figure 4:
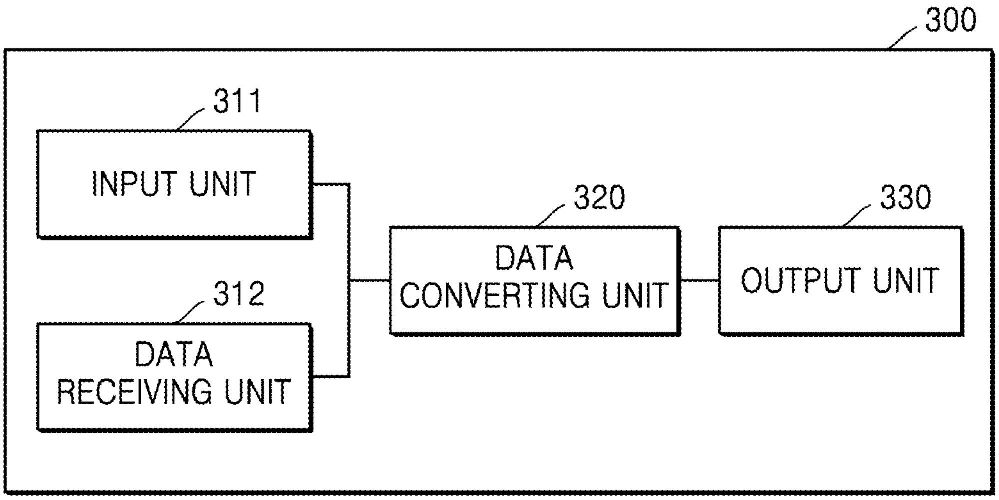
FIG. 4 is a diagram illustrating an internal configuration of a user terminal according to an embodiment of the present disclosure.

FIG. 4 is a diagram illustrating an internal configuration of a user terminal 300 according to an embodiment of the present disclosure.

The user terminal 300 according to an embodiment of the present disclosure may be a personal computer of the user or a mobile terminal of the user. More particularly, the user terminal 300 may include a computer (e.g., a desktop, a laptop, or a tablet), a media computing platform (e.g., a cable, a satellite set-top box, or a digital video recorder), a handheld computing device (e.g., a PDA or an email client), any type of mobile phone, or any other type of computing or communication platform, but the present disclosure is not limited thereto.

Referring to FIG. 4, the user terminal 300 according to an embodiment of the present disclosure may include an input unit 311, a data receiving unit 312, a data converting unit 320, and an output unit 330. Also, according to an embodiment of the present disclosure, the user terminal 300 may be a single device. However, in another embodiment, the user terminal 300 may include two separate devices communicating with each other, and in this case, the input unit 311 and the output unit 330 may be implemented in different devices. For example, the input unit 311 may be implemented in a smart phone, and the output 330 may be implemented in a smart watch communicating with a smart phone.

More particularly, the input unit 311 may receive information about the boarding wish bus from the user. In order to receive data from the user, the input unit 311 may include any input device for collecting data, such as a keyboard, a microphone, and a touch pad. According to an embodiment of the present disclosure, there is no limit to the format of input data that may be input by the input unit 311.

Also, the data receiving unit 312 may receive data from the server 100 or another device. Particularly, the data receiving unit 312 may receive information about the boarding position from the server 100. Also, the data receiving unit 312 according to an embodiment of the present disclosure may further include a communication interface. The communication interface may be an interface including hardware and software necessary to transmit and receive signals such as control signals or data signals through wired or wireless connection.

Next, the data converting unit 320 may convert output data into an output control signal that may be interpreted by the output unit 330. According to an embodiment of the present disclosure, the output data may be a signal for guiding the boarding position received from the server 100. The data converting unit 320 may convert a signal for guiding the boarding position according to the characteristics of the output unit 330 such that the signal may be output as a tactile signal from the output unit 330.

More particularly, when the output unit 330 outputs information through a vibration, the data converting unit 320 may generate an output control signal to generate a vibration corresponding to the output data. When the output unit 330 outputs information through a nerve or a cell, the data converting unit 320 may generate an output control signal to generate a stimulus, a sense, or the like corresponding to the output data. The data converting unit 320 may generate an output control signal that may be directly transmitted to the brain nerves or brain cells of the user or may generate an output control signal that may be directly transmitted to the nerves or cells that may detect other senses. The mode, type, and format of the output control signal generated by the data converting unit 320 may vary depending on the way, method, and algorithm of transmission.

Next, the output unit 330 may be a device controlled by the output control signal to transmit a tactile signal to the user. More particularly, the output unit 330 may directly or indirectly transmit data to the user. The output unit 330 may be any type of output device that may transmit a tactile signal such as a braille signal or a haptic signal to the user.

According to an embodiment of the present disclosure, the output unit 330 may transmit data to the user through one or more bumps. Each of the bumps may linearly move in a vertical direction to give the user a stimulus in the form of a one-dimensional point or may linearly move in a horizontal direction to give the user a stimulus in the form of a two-dimensional line. Also, a plurality of bumps may simultaneously or sequentially hit the user to generate a stimulus corresponding to an action in the real world and an action in the virtual world. In order to control the movement of bumps, the output control signal may include the movement direction, movement time, and movement duration of one or more bumps.

In this case, at least one output unit 330 may be arranged at a position corresponding to the user's nerves, cells, or blood vessels to transmit data through the user's nerves, cells, or blood vessels, and at least one output unit 330 may generate a stimulus and/or a signal that the user may feel through the nerves. Also, at least one output unit 330 may be connected to the user's brain to transmit data that may be understood through the user's brain.

FIGS. 5A-5D are diagrams schematically illustrating an external appearance of a user terminal 300 including an output unit 330 according to an embodiment of the present disclosure.

The user terminal 300 may include the output unit 330 provided at a portion of the user terminal 300 as described above. According to an embodiment of the present disclosure, the output unit 330 may include, on an expression surface thereof, bumps 30*n* arranged to face the user. Thus, a protrusion signal caused by the selective protrusion of the bumps 30*n* expressed on the expression surface may be recognized as a direct and local hit to the user, and the user may directly receive a vibration at the position hit by the bumps 30*n*. Unlike a general vibration signal of a mobile electronic device, the protrusion signal formed by the direct and local hit may transmit an accurate signal to the user because it does not cause a residual vibration around a target. Thus, a signal acquired through the tactile sense such as braille may be implemented by the protrusion signal as described above, and also various signals such as military signals, picture signals, sign signals, and direction signals may be accurately implemented. That is, the expression surface of the user terminal 300 illustrated in FIGS. 5A-5D may be located to contact the user's skin.

Figure 5A:
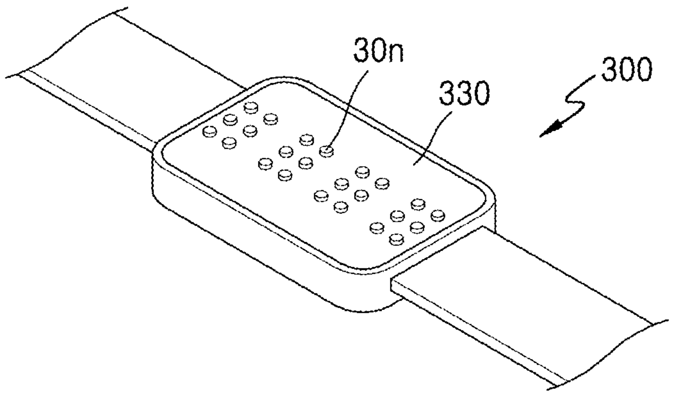
FIGS. 5A-5D are diagrams schematically illustrating an external appearance of a user terminal including an output unit according to an embodiment of the present disclosure.

For example, FIG. 5A illustrates an external appearance of a user terminal 300 having an independent output unit 330 including bumps 30*n*, and the user terminal 300 is implemented in the form of a smart watch including a watch strap. Although not illustrated in FIGS. 5A-5D, the user terminal 300 implemented as a smart watch may further include the data receiving unit 310 and the data converting unit 320 described above. The user terminal 300 may include a braille display device that displays output data by linear movement of the bump 30*n*. In the case of the user terminal 300 illustrated in FIG. 5A, the user may directly touch the bump 30*n* with the hand to recognize output data corresponding to object information. In addition, the user terminal 300 may include a vibration motor for controlling the selective protrusion of the bumps 30*n*.

Figure 5B:
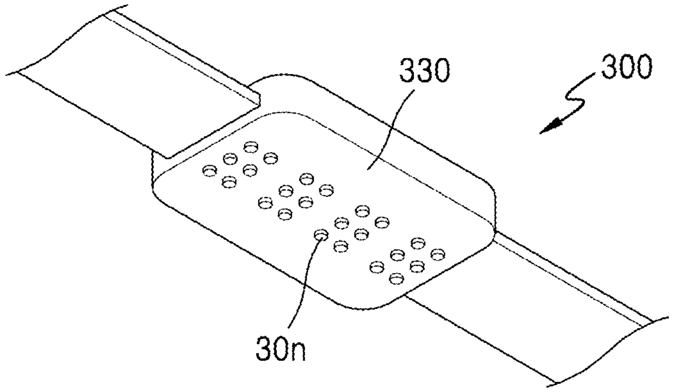

Also, according to another embodiment, FIG. 5B illustrates an external appearance of a user terminal 300 (as a smart watch interlocked with a smart phone) including an output unit 330 including bumps 30*n*. FIG. 5B illustrates that an upper portion of the smart watch may include one of an organic light emitting display unit, an inorganic light emitting display unit, and a liquid crystal display unit and a lower portion of the smart watch may include the bump 30*n* of the output unit 330. In the case of the user terminal 300 as a smart watch illustrated in FIG. 5B, a portion of the body of the user wearing the smart watch may sense a linear movement of the bump 30*n* to recognize output data corresponding to a detected action. In addition, the user terminal 300 may include a vibration motor.

Figure 5C:
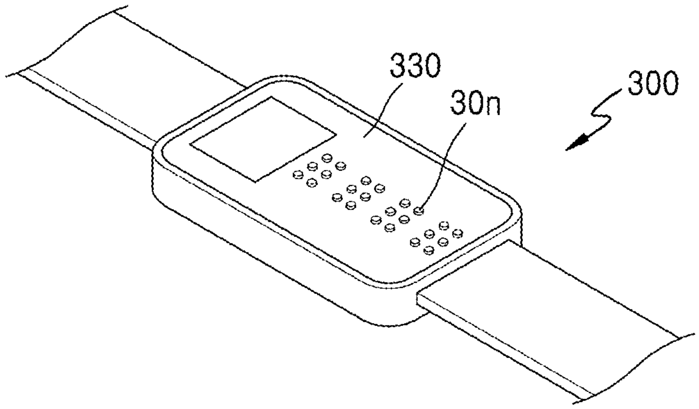

Also, FIG. 5C illustrates an external appearance of a user terminal 300 (as a smart watch interlocked with a smart phone) including an output unit 330 including bumps 30*n*. FIG. 5C illustrates that a display unit and the bump 30*n* of the user terminal 300 may be implemented at an upper portion of the smart watch. In the case of the user terminal 300 as a smart watch combined with the user terminal 300 illustrated in FIG. 5C, the user may directly touch the bump with the hand to recognize output data corresponding to a detected action. In addition, the user terminal 300 may include a vibration motor.

Figure 5D:
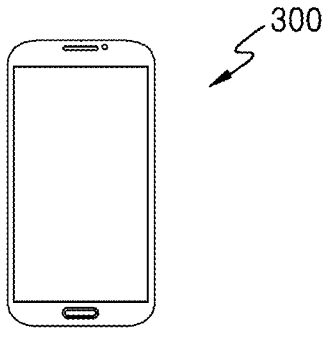

FIG. 5D illustrates an external appearance of a user terminal 300 (as a smart phone) including an output unit 330 including bumps 30*n*. In addition, the output unit 330 may include a vibration motor.

Figure 6A:
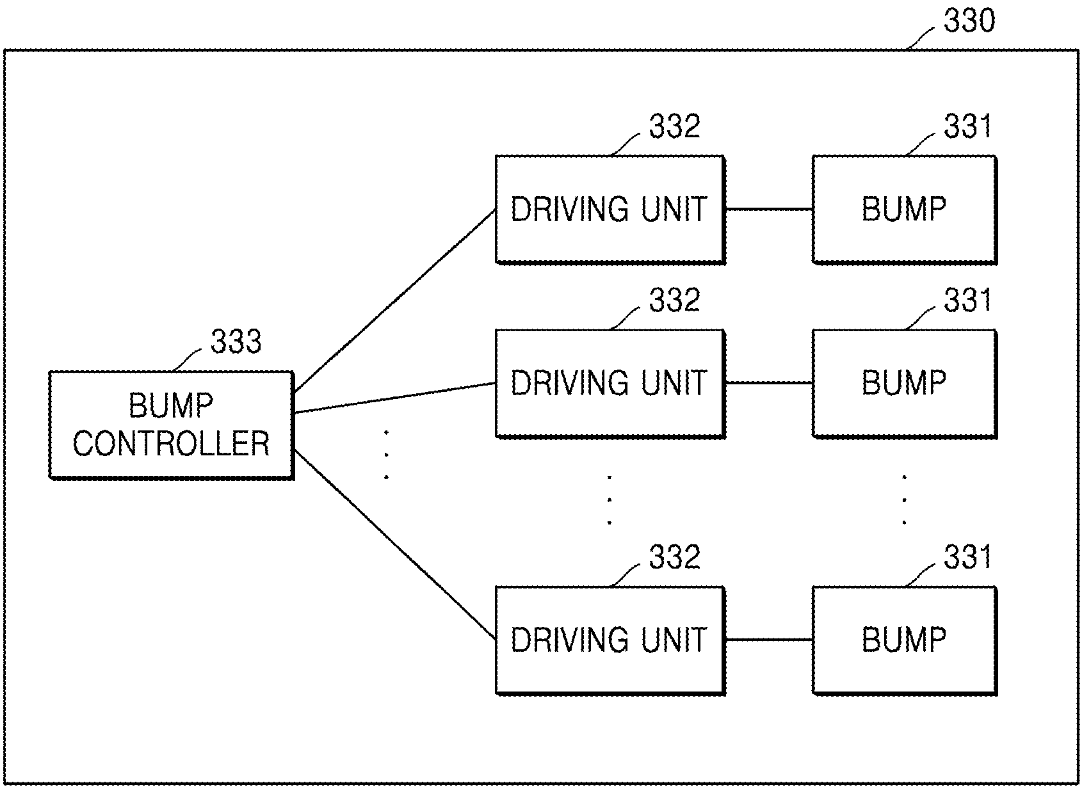
FIGS. 6A-6C are diagrams schematically illustrating a detailed configuration of an output unit of a user terminal.
Figure 6B:
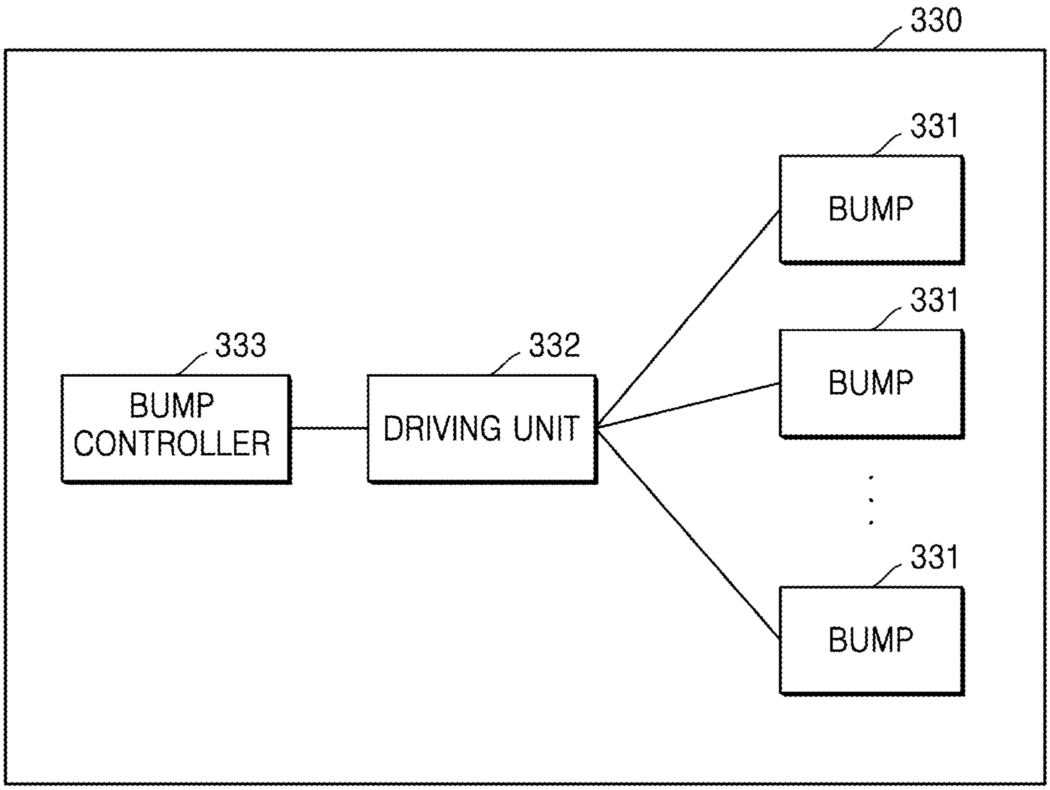
Figure 6C:
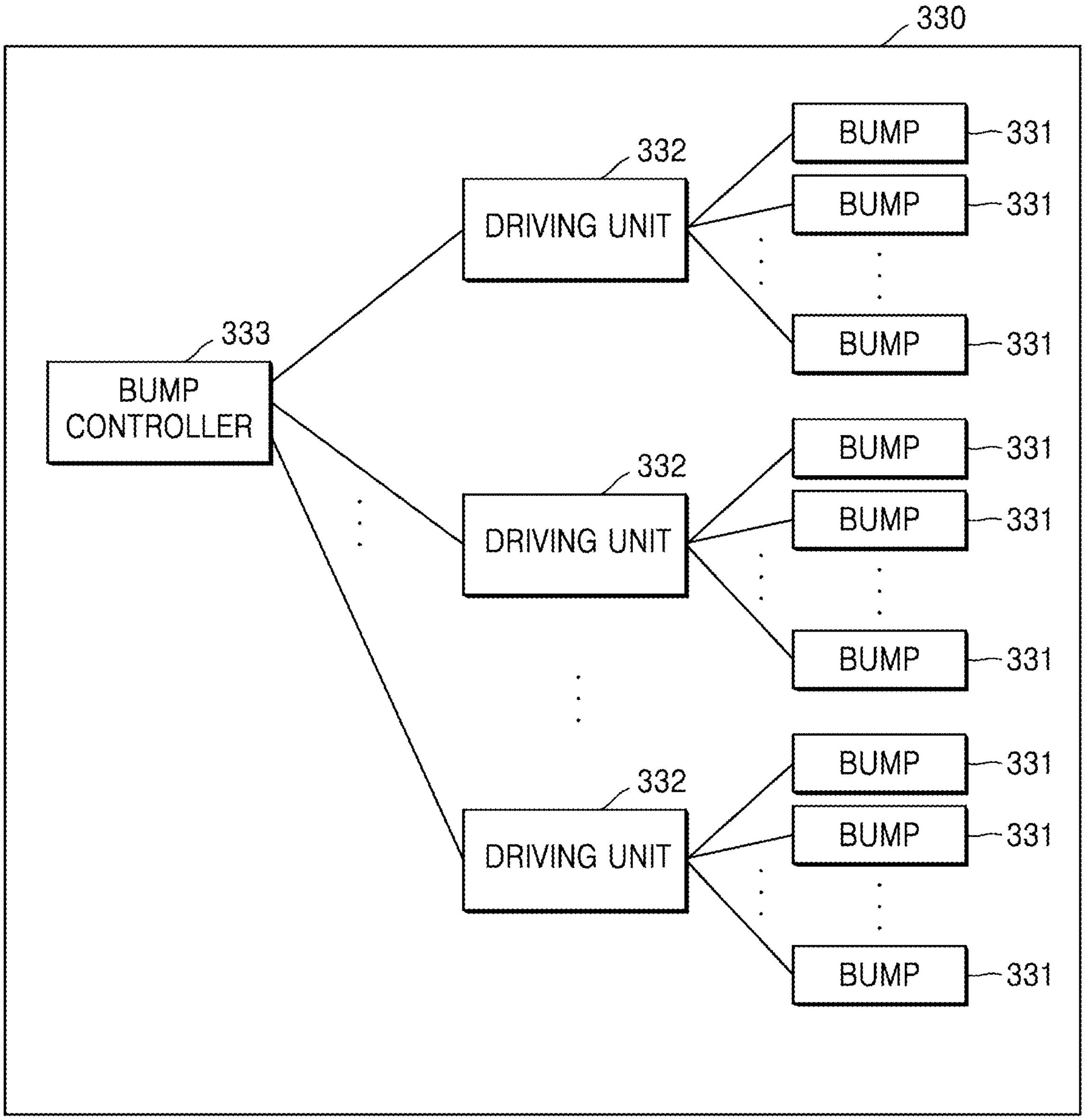

FIGS. 6A-6C are diagrams schematically illustrating a detailed configuration of an output unit 330 of a user terminal 300.

Referring to FIG. 6A, the output unit 330 may include a plurality of bumps 331, a plurality of driving units 332, and a bump controller 333. The bumps 331 may include, for example, a total of 24 bumps corresponding to 8 rows and 3 columns, and the driving units 332 may include a total of 24 driving units respectively connected to the 24 bumps 331. The bumps 331 may be electrically connected respectively to the driving units 332, and each of the driving units 332 may receive a driving control signal from the bump controller 333 to linearly move at least one selected bump 331. In this case, the selected bump may be linearly moved to a position that is higher than the unselected bump. The bump controller 333 may generate a driving control signal corresponding to the received output control signal, that is, at least one of a bump selection signal, a bump protrusion time, and a bump protrusion period, which are preset, and output the generated driving control signal to the driving unit 332, and at least one driving unit 332 receiving the driving control signal may linearly move the corresponding bump 331. Thus, the user having the user terminal 300 may recognize information to be described by an object by the linear movement of the bump 331.

Referring to FIG. 6B, a plurality of bumps 331 included in the output unit 330 may be electrically connected to one driving unit 332, and the driving unit 332 may receive a driving control signal from the bump controller 333 to linearly move at least one selected bump 331.

Referring to FIG. 6C, some of a plurality of bumps 331 included in the output unit 330 may be electrically connected to any one of a plurality of driving units 332, and each driving unit 332 may receive a driving control signal from the bump controller 333 to linearly move at least one selected bump 331.

By the above movement of the bumps illustrated in FIGS. 5A-5D and FIGS. 6A-6C, the user may recognize the boarding position of the boarding bus as a tactile signal. However, the present disclosure is not limited to the output unit 330 that generates a tactile signal by the bump as illustrated in FIGS. 5A-5D and FIGS. 6A-6C, and the output unit 330 may be designed in any of various types capable of transmitting a tactile signal.

Figure 7:
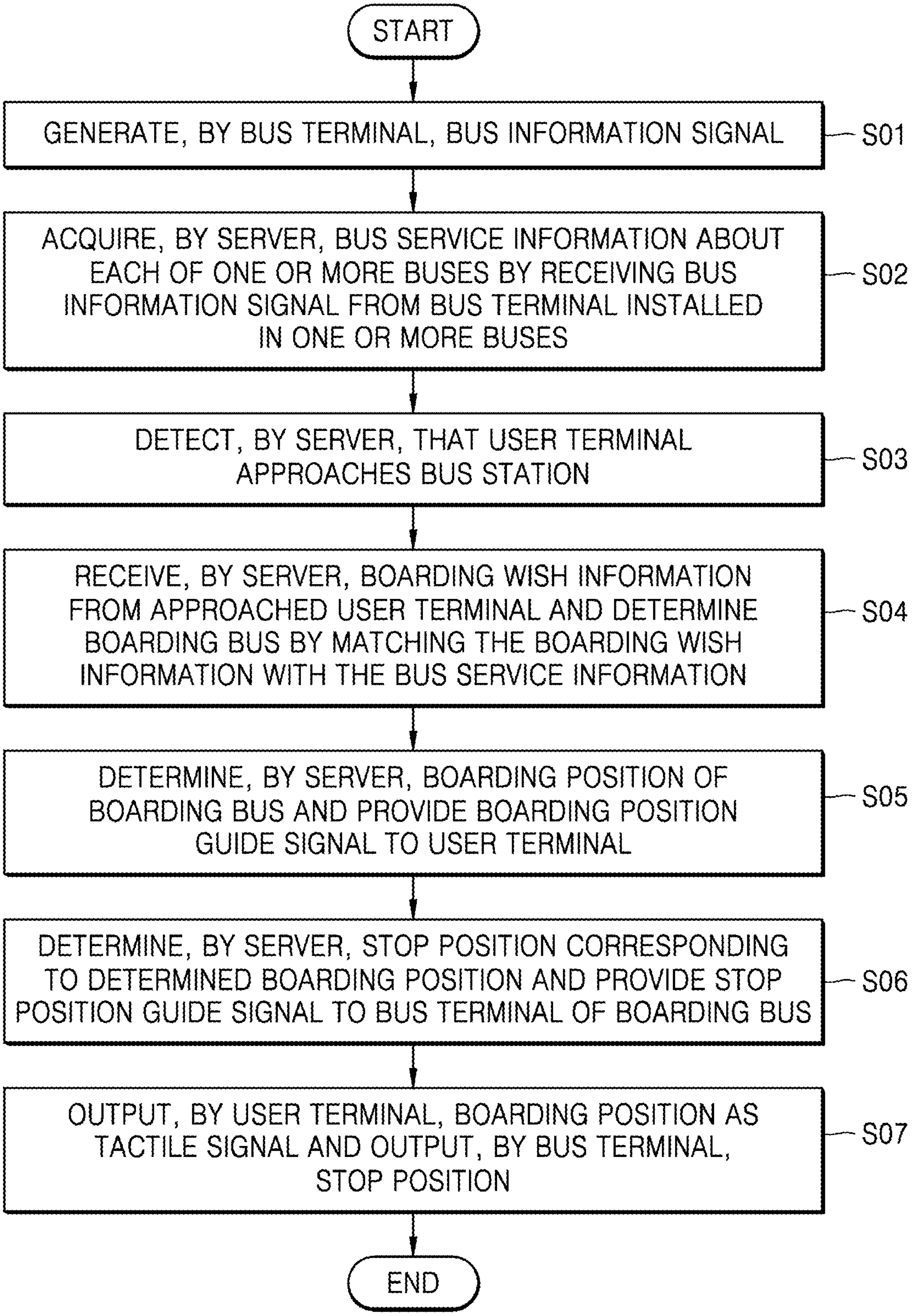
FIG. 7 is a flowchart illustrating an execution procedure of a boarding information guiding method according to an embodiment of the present disclosure.

FIG. 7 is a flowchart illustrating an execution procedure of a boarding information guiding method according to an embodiment of the present disclosure.

Referring to FIG. 7, the bus terminal 200 may generate a bus information signal and transmit the same to the server 100 (operation S01).

Next, the server 100 may receive a bus information signal from the bus terminal 200 installed in at least one bus, to acquired bus service information for each of the at least one bus (operation S02).

Next, the server 100 may detect that the user terminal approaches the bus station (operation S03).

Next, the server 100 may receive boarding wish information from the approached user terminal 300 and match the boarding wish information with the bus service information to determine a boarding bus (operation S04).

Next, the server 100 may determine a boarding position of the boarding bus and provide a signal for guiding the boarding position to the user terminal 300 (operation S05).

Next, the server 100 may determine a stop position corresponding to the determined boarding position and transmit a signal for guiding the stop position to the bus terminal 200 of the boarding bus (operation S06).

Next, the user terminal 300 may output the boarding position as a tactile signal, and the bus terminal 200 may output the stop position (operation S07).

Herein, a target signal may be a signal generated by the user terminal and may refer to a signal for requesting information related to a method of achieving a certain purpose. Particularly, the target signal may include a target position, a desired purpose (shopping, travel, etc.), or the like. Also, the target signal may further include a start position input by the user or a start position acquired by a position detecting module GPS mounted on the user terminal.

Herein, guide data may be data related to a method of accomplishing an object obtained by analyzing the target signal, and particularly, the guide data may include at least one transmitting device that has to be visited, approached, and contacted to reach a target position included in the target signal, and the position of the at least one transmitting device.

Herein, instruction data may refer to data corresponding to each of at least one operation included in a method of achieving the purpose included in the target signal. The instruction data may be data corresponding to each of at least one operation included in a method of reaching a certain target position and may refer to data generated to correspond to a subsequent operation in consideration of the operations already performed by the user. The instruction data may be transmitted to the user terminal that has transmitted the target signal or to the transmitting device related to each instruction data. The structure of each instruction data may vary depending on the transmitting device (user terminal or transmitting device) of the instruction data. For example, the instruction data transmitted to the user terminal may include information (identification information, position, route, and the like) about the transmitting device related to an operation to be currently performed by each user terminal. The instruction data transmitted to the transmitting device may include information (identification information, phone number, etc.) about the user terminal that should approach the transmitting device.

Figure 8:
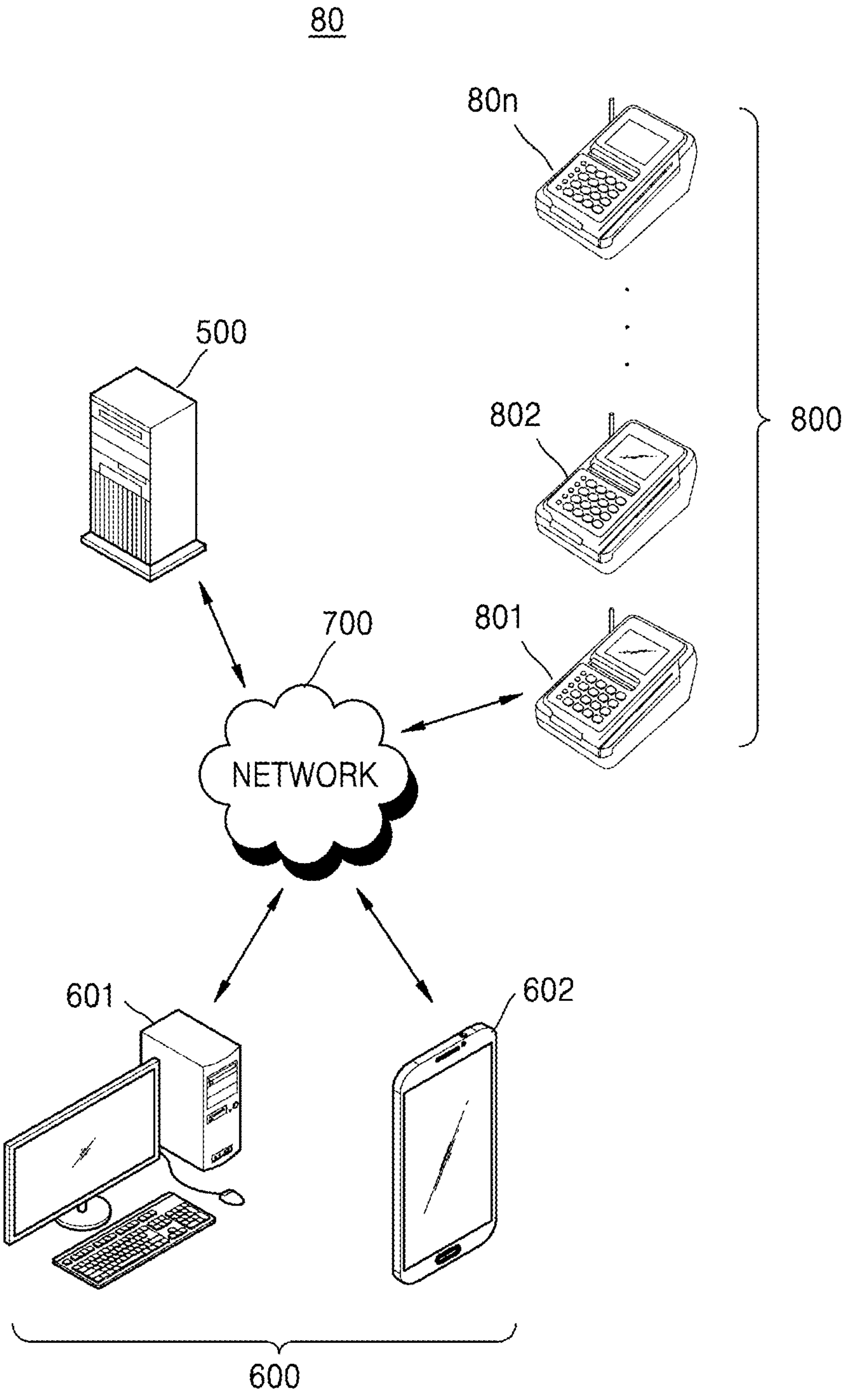
FIG. 8 is a diagram illustrating a procedure managing system according to embodiments of the present disclosure.

FIG. 8 is a diagram illustrating a procedure managing system 80 according to an embodiment of the present disclosure.

Referring to FIG. 8, the procedure guiding system 80 according to an embodiment of the present disclosure may include a procedure managing device 500, a user terminal 600, a communication network 700, and a transmitting device 800.

The procedure managing device 500 may analyze the target signal received from the user terminal 600, to generate guide data including operations for reaching the target position included in the target signal, and generate instruction data that each user should currently perform, in consideration of the guide data and the current state of the user.

The procedure managing device 500 may transmit a signal such that the transmitting device related to an operation that should be currently performed by each user, that is, instruction data, may be detected by each user terminal. In this case, the procedure managing device 500 may transmit a signal corresponding to the instruction data to the user terminal. Alternatively, the procedure managing device 500 may transmit a signal corresponding to the instruction data to the transmitting device.

The user may access the procedure managing device 500 through the user terminal 600. The user terminal 600 may be connected to the procedure managing device 500 to transmit a target signal corresponding to a place to be reached or a purpose to be achieved by the user. The user may generate a target signal corresponding to a purpose such as reaching 'Busan Station' or purchasing 'shirts'.

The user may generate a target signal corresponding to a target position, a desired task, or the like to be reached through the user terminal 600 and transmit the target signal to the procedure managing device 500. The user may receive instruction data to be performed next from the procedure managing device 500 through the user terminal 600. Also, the user may detect the transmitting device 800 related to an operation to be performed through the user terminal 600. Also, the user may communicate with the transmitting device 800 related to the instruction data that should be reached at the current state through the user terminal 600.

A plurality of user terminals 600 may refer to communication terminals that may use a web service in a wired/wireless communication environment. Here, the user terminal 600 may be a personal computer 601 of the user or a mobile terminal 602 of the user. Although the mobile terminal 602 is illustrated as a smart phone in FIG. 8, the scope of the present disclosure is not limited thereto and any terminal mounted with an application capable of web browsing as described above may be used without limitation.

More particularly, the user terminal 600 may include a computer (e.g., a desktop, a laptop, or a tablet), a media computing platform (e.g., a cable, a satellite set-top box, or a digital video recorder), a handheld computing device (e.g., a PDA or an email client), any type of mobile phone, or any other type of computing or communication platform, but the present disclosure is not limited thereto.

Meanwhile, the communication network 700 may connect a plurality of user terminals 600 to the procedure managing device 500. That is, the communication network 700 may refer to a communication network that provides a connection path such that the user terminals 600 may access the procedure managing device 500 and then transmit and receive data. The communication network 700 may include, for example, wired networks such as Local Area Networks (LANs), Wide Area Networks (WANs), Metropolitan Area Networks (MANs), and Integrated Service Digital Networks (ISDNs), and wireless networks such as wireless LANs, CDMA, Bluetooth, and satellite communication networks, but the scope of the present disclosure is not limited thereto.

The transmitting device 800 may be a device installed together with the facility to inform the user terminal of the position of the facility, and the transmitting device 800 may be installed corresponding to a position where a boarding pass is issued, an entrance/exit of a certain facility, an elevator/escalator for moving to another floor, a particular shop, a toilet, a rest room, or the like. In order to inform its own position and function, the transmitting device 800 may continuously transmit an identification number of each device, which is given in advance for distinction from other facilities, without limitation of a receiving device. Through the transmitting device performing such a function, the user terminal may be informed of particular facilities (escalator, elevator, entrance, ticket gate, subway boarding position, route for transfer, etc.).

In another embodiment, the transmitting device 800 may wait for the user terminal 600 to be approached. The transmitting device 800 receiving a certain signal from the waiting user terminal may transmit such a fact to the procedure managing device 500.

A related art device for guiding a route for reaching a target position may guide the route based on a position for moving to the target position. That is, when a route to "Tower Palace" is requested, the shortest distance to "Tower Palace" may be provided as one piece of visual data. Also, the related art route guiding device may provide driving-related information according to a driving state for a vehicle driver, for movement to the target position. On the other hand, the procedure guiding system 80 according to embodiments of the present disclosure may sequentially transmit the instruction data corresponding to the stepwise operations for reaching a certain target position. Also, the procedure guiding system 80 according to embodiments of the present disclosure may provide one or more pieces of instruction data for reaching a desired target position even by a user who moves on foot, a user who may not recognize visual data, or a foreigner who may not recognize the language.

Figure 9:
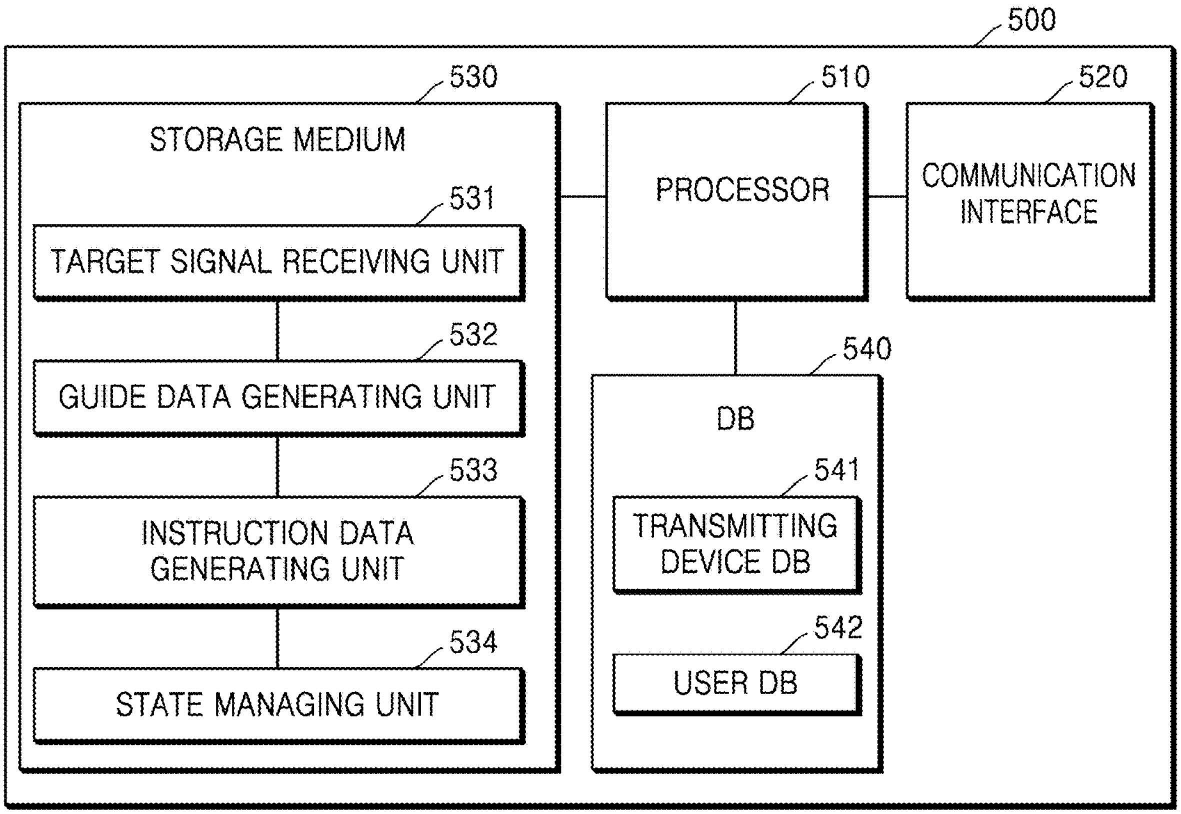
FIG. 9 is a block diagram of a procedure managing device according to embodiments of the present disclosure.

FIG. 9 is a block diagram of a procedure managing device 500 according to embodiments of the present disclosure.

Referring to FIG. 9, the procedure managing device 500 according to embodiments of the present disclosure may include a processor 510, a communication interface 520, a storage medium 530, and a database (DB) 540.

In general, the processor 510 may control an overall operation of the procedure managing device 500. For example, the processor 510 may control execution of a target signal receiving unit 531, an instruction data generating unit 533, a guide data generating unit 532, and a state managing unit 534 as well as control software installed in the storage medium 530.

Herein, the processor 510 may refer to, for example, a data processing device that is embedded in hardware and has a physically structured circuit to perform a function represented by the commands or codes included in a program. As an example, the data processing device embedded in hardware may include any processing device such as a microprocessor, a central processing unit (CPU), a processor core, a multiprocessor, an application-specific integrated circuit (ASIC), or a field programmable gate array (FPGA); however, the present disclosure is not limited thereto.

The communication interface 520 may be a device including hardware and software necessary to transmit and receive signals such as control signals or data signals through wired or wireless connection with other network devices.

The storage medium 530 may refer to a storage device included in the procedure managing device 500 or electrically connected to the procedure managing device 500. The storage medium 530 may store a plurality of modules for operation of the procedure managing device 500. The storage medium 530 be used to drive various functions of applications (game application, web browser, messenger application, shopping application, social network service application, etc.) mounted in the procedure managing device 500.

The storage medium 530 may include at least one type of storage medium from among flash memory type, hard disk type, multimedia card micro type, card type memory (e.g., SD and XD memories), random-access memory (RAM), static random-access memory (SRAM), read-only memory (ROM), electronically erasable programmable read-only memory (EEPROM), programmable read-only memory (PROM), magnetic memory, magnetic disk, and optical disk. Also, the procedure managing device 500 may operate a cloud server or a web storage for performing a storage function of the storage medium 530 on the Internet.

The target signal receiving unit 531 may receive a target signal from the user terminal 600. The target signal may essentially include information about the target position to be reached by each user. In an alternative embodiment, in addition to information about the target position, the target signal may further include start point information or a transportation means to be used by the user.

The guide data generating unit 532 may analyze the received target signal to generate guide data. The guide data generating unit 532 may determine a moving vehicle for moving to the target position in consideration of the target position information included in the target signal and the current position acquired from the user terminal, and generate guide data including, in order, one or more transmitting devices related to a detailed operation to be performed to arrive at the target position by the moving vehicle. More particularly, the guide data generating unit 532 may determine the current position of the user terminal through the position measuring module GPS mounted on the user terminal, and determine the nearest public transportation means (subway, bus, etc.) from the position of the user terminal. Also, the guide data generating unit 532 may determine the easiest transportation means to the target position as the moving vehicle. The guide data generating unit 532 may generate guide data including, in order, the places to be passed to move from the current position to the boarding place of the public transportation means, board the public transportation means, and reach the target position. Here, the guide data may represent the places to be passed, as an image, or may include signals corresponding to the positions to be passed.

Also, the instruction data generating unit 533 may extract and generate instruction data necessary for the user at the current time by considering the position of the user terminal, the preference condition of the user, and/or the guide data. Here, the preference condition may be determined by the user or by considering a behavior pattern of the user through the user terminal. The preference condition may include information to be considered for movement and information related to the body of the user, such as “blind person”, “deaf person”, “wheelchair”, “stroller”, and “bicycle”. For the user riding the ‘wheelchair’, the ‘subway’ that is a transportation means for reaching the target position by using the ‘wheelchair’ may be selected, and instruction data including ‘ticket purchase’, ‘ticket gate’, ‘boarding position’ capable of wheelchair riding, and the like may be generated. Particularly, the instruction data generating unit 533 may select and provide one piece of instruction data according to the current state of each user.

The instruction data generating unit 533 may determine the current state of the user by considering the position of the user terminal, considering a response signal from the transmitting device or the user terminal, or considering the state information stored in the user terminal. Particularly, the instruction data generating unit 533 may determine the current state by reading the state information from the user terminal, but when failing to read the state information from the user terminal, the instruction data generating unit 533 may analyze the latest response signal received in response to the target signal of the user terminal or the position of the user terminal to extract the instruction data corresponding to the operation to be performed at the current time. The current state of the user may be set differently according to the already-performed instruction data among one or more pieces of instruction data corresponding to the target signal. For example, as for the instruction data of five steps, the state information of the user who has performed the instruction data of three steps may be set to ‘3’. That is, it may be determined by considering the number of operations performed on the guide data including the operation of ten steps in total.

The instruction data generating unit 533 may transmit the generated instruction data to the transmitting device corresponding to the instruction data by considering the target signal received from the user, the current state of the user, and/or the preference condition thereof. Here, the transmitting device corresponding to the instruction data may refer to a transmitting device located at a position corresponding to an operation included in the instruction data, for example, ‘boarding position’, ‘ticket gate’, ‘ticket purchase’, or the like. The instruction data generating unit 533 may determine whether the operation corresponding to the transmitted instruction data has been performed. The instruction data generating unit 533 may analyze the instruction data and extract the distance between the user terminal (i.e., the performing entity) and the transmitting device corresponding to the operation to be performed, to determine whether the operation corresponding to the instruction data has been performed. The instruction data generating unit 533 may determine whether the operation corresponding to the instruction data has been performed, through the response signal received from one of the user terminal (i.e., the performing entity) corresponding to the instruction data and the transmitting device corresponding to the instruction data. The instruction data generating unit 533 may determine whether the operation corresponding to the instruction data has been performed, through the state information stored in the user terminal.

In an alternative embodiment, the instruction data generating unit 533 may transmit each instruction data to the user terminal 600. The instruction data transmitted to the user terminal 600 may include information (position, identification information, etc.) about the transmitting device corresponding to the operation to be currently performed, by considering one or more operations of the user terminal directed to the target position. In the present embodiment, the user terminal 600 may be controlled to approach and reach the transmitting device corresponding to each instruction data, by using the route information to the transmitting device and the identification information of the transmitting device acquired from the received instruction data. The transmitting device 800 not receiving the instruction data may randomly transmit, to a peripheral device, a signal including its own identification information at a certain time period, for example, every 5 seconds, in order to inform the user terminal of its own position. In the present embodiment, the instruction data generating unit 533 may wait for a response signal from the user terminal. When the response signal is not received within a preset threshold time from the time of transmitting first instruction data, the instruction data generating unit 533 may transmit the first instruction data and the route information for arriving at the transmitting device corresponding to the first instruction data to the user terminal and wait for a response signal from the user terminal. In the present embodiment, the response signal may be a signal generated by the user terminal according to the detection of arrival at the transmitting device extracted by the instruction data.

In an alternative embodiment, the instruction data generating unit 533 may transmit the instruction data generated corresponding to the current state of the user to the transmitting device 800 corresponding to the instruction data. The instruction data transmitted to the transmitting device may include information about the user terminal for which each transmitting device should wait. In this case, the transmitting device 800 may detect the user terminal corresponding to the received instruction data by using information (phone number, user ID, etc.) about the user terminal acquired from the received instruction data. In the present embodiment, the user terminal 600 that has transmitted the target signal may continuously transmit a signal including its own identification information. The transmitting device 800 may recognize the user terminal through the transmitted signal. If the instruction data generating unit 533 fails to receive a response signal within a preset threshold time from the time of transmitting the instruction data, the instruction data generating unit 533 may again transmit the instruction data to the user terminal and the transmitting device corresponding to the instruction data. In the present embodiment, the response signal may be a signal generated by the transmitting device according to the detection of the approach to the user terminal extracted by the instruction data. The instruction data generating unit 533 may generate not only the instruction data corresponding to the target signal received from the user but also recommendation data for each user. For example, the instruction data generating unit 533 may generate instruction data including convenience facilities, restaurant information, famous restaurant information, sightseeing information, or the like within a certain distance by considering the current state of the user. Also, in generating the instruction data for the first user, the instruction data generating unit 533 may consider the current state or situation of one or more other users. For example, when the instruction data for the first user corresponds to ticket purchase, the instruction data generating unit 533 may generate the instruction data for the first user including information about a place where the user may wait, such as toilet, bench, or the like, before the instruction data of the ticket purchase, by considering a situation where a user other than the first user purchases a ticket. That is, the instruction data generating unit 533 may consider the current state of another user in generating the instruction data for the first user.

The state managing unit 534 may manage state information of one or more users requesting a target signal. The state managing unit 534 may generate state information with respect to each user who has transmitted the target signal, and may directly store or manage the state information or store the state information in the user terminal. The state information may be generated corresponding to the instruction data performed by each user among the guide data generated corresponding to each user. That is, the state information may be '3' when the user has performed an operation corresponding to the third instruction data.

In an alternative embodiment, when the instruction data is transmitted to the user terminal, the state managing unit 534 may control the state information of each user to be stored in a certain storage region of the user terminal 600. The user terminal 600 that has transmitted the target signal may have a certain storage region for recording all operations such as reception of the instruction data and detection of the transmitting device. That is, when the transmitting device corresponding to the received instruction data is recognized, the user terminal 600 may store and manage such information in a certain storage region. The user terminal 600 may update the state information through the search and detection of the transmitting device 800 corresponding to the instruction data and the received instruction data.

In another embodiment, the state managing unit 534 may determine the current state of each user through the position of each user terminal without separately managing the state information.

Also, when the instruction data is transmitted to the transmitting device, the state managing unit 534 may generate the state information by determining the current state of each user through the response signal received from the transmitting device. In this implementation, the user terminal 600 may update the state information under the control of the transmitting device 800 that has received the instruction data.

When there is no instruction data corresponding to a subsequent operation of the instruction data recently transmitted through the state information acquired by analyzing the received response signal, the state managing unit 534 may terminate the guide data corresponding to the target signal from the user.

The database 540 may include a transmitting device DB 541 for storing and managing information about the transmitting device necessary to generate guide data and instruction data, and a user DB 542 for managing information about the user managed through the guide data and the instruction data.

Figure 10:
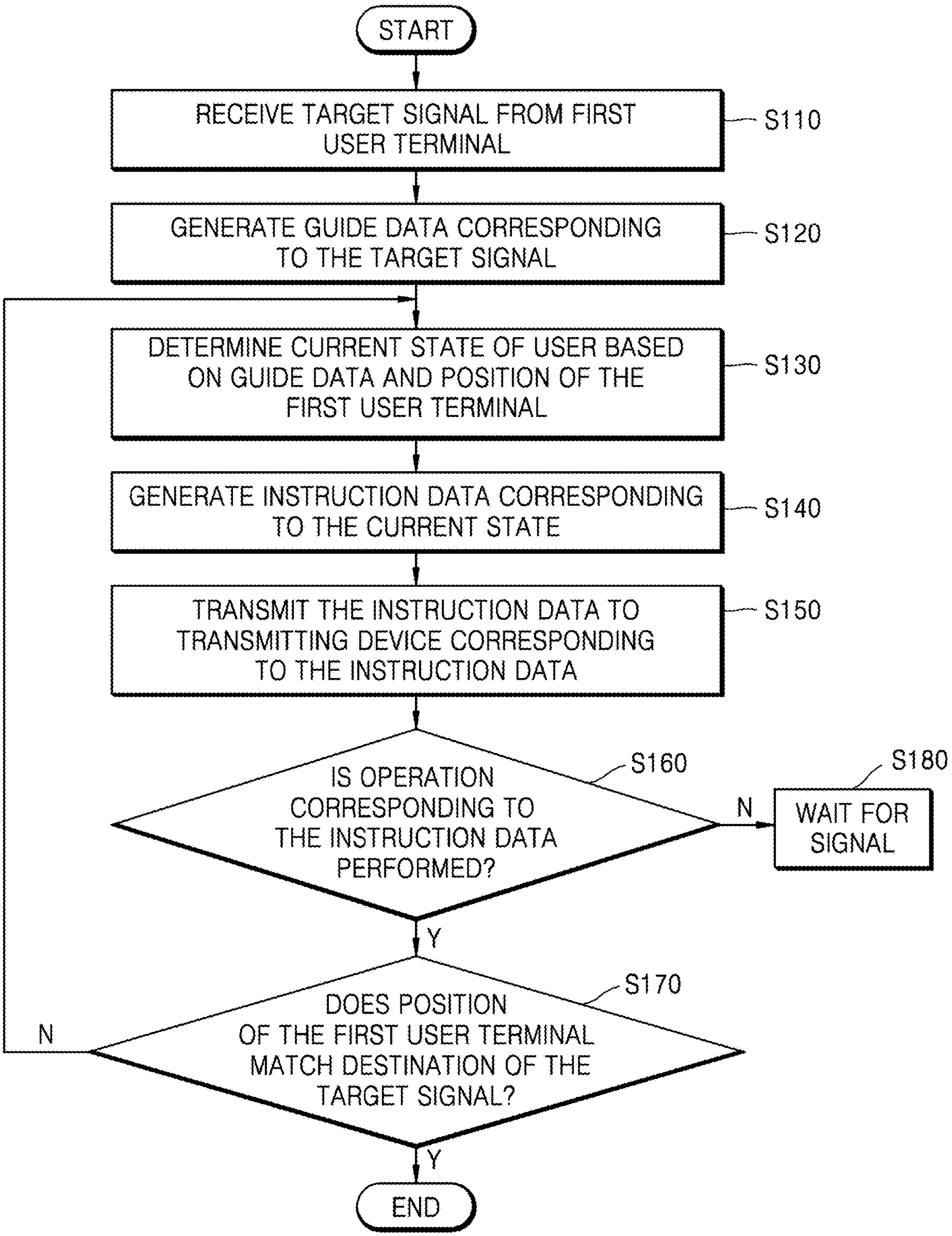
FIGS. 10 and 11 are flowcharts illustrating a procedure managing method according to an embodiment of the present disclosure.
Figure 11:
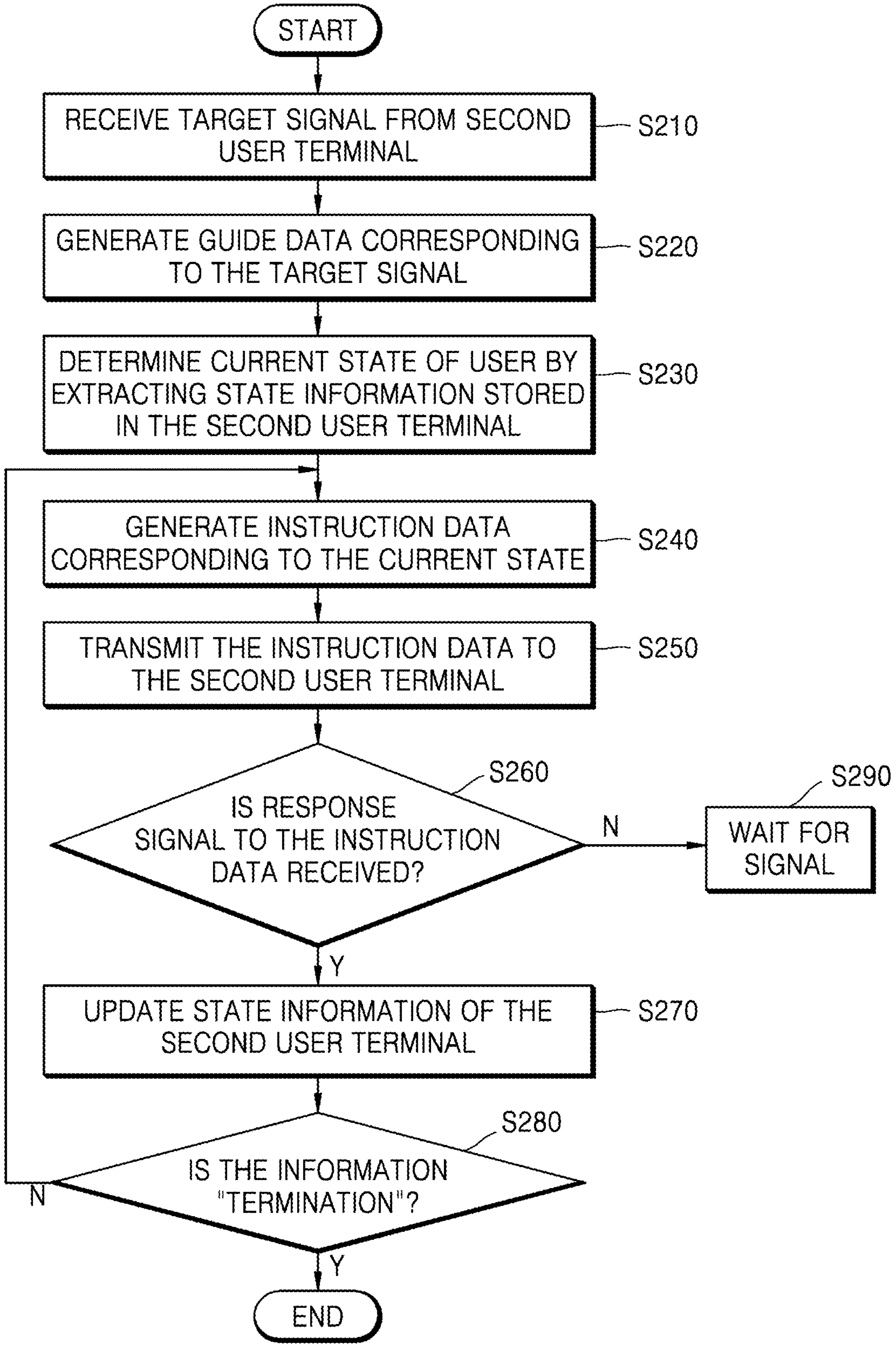

FIGS. 10 and 11 are flowcharts illustrating a procedure managing method according to embodiments of the present disclosure.

Referring to FIG. 10, the procedure managing method according to embodiments of the present disclosure may include a target signal receiving operation S110, a guide data generating operation S120, a state determining operation S130, an instruction data generating operation S140, a data transmitting operation S150, an operation performance status determining operation S160, and a mission termination status determining operation S170 corresponding to a target signal.

The procedure managing device 500 may receive a target signal from the user terminal (operation S110).

The procedure managing device 500 may analyze the target signal to generate guide data (operation S120). The procedure managing device 500 may determine a moving vehicle for moving to the destination in consideration of the destination included in the target signal and the current position acquired from the user terminal, and generate guide data including, in order, one or more transmitting devices related to a detailed operation to be performed to arrive at the destination. More particularly, the procedure managing device 500 may determine the current position of the user terminal through the position measuring module GPS mounted on the user terminal, and determine the easiest, nearest, or available public transportation means (subway, bus, etc.) from the current position of the user terminal.

The procedure managing device 500 may generate the guide data by considering the preference condition input from the user. For example, in response to the target signal received from the terminal of the user riding a wheelchair, the procedure managing device 500 may generate the guide data based on the path for movement by the wheelchair. In response to the target signal received from the terminal of the user who is blind, the procedure managing device 500 may generate the guide data based on the path for movement of the blind. In response to the target signal received from the terminal of the user having a bicycle, the procedure managing device 500 may generate the guide data based on the path for boarding with the bicycle.

The procedure managing device 500 may generate guide data including, in order, the paths or places to be passed to move from the current position to the boarding place of the public transportation means, board the public transportation means, and reach the destination.

The procedure managing device 500 may determine the current state of the user by considering the guide data and the position of the user terminal (operation S130). The instruction data generating unit 533 may determine the current state of the user by considering the position of the user terminal, considering a response signal from the transmitting device or the user terminal, or considering the state information stored in the user terminal. Particularly, the instruction data generating unit 533 may determine the current state by reading the state information from the user terminal, but when failing to read the state information from the user terminal, the instruction data generating unit 533 may analyze the position of the user terminal or the latest response signal received in response to the target signal of the user terminal, to extract the instruction data corresponding to the operation to be performed at the current time. For example, the current state of the user may be determined based on the order of the instruction data matching the position of the user terminal, by considering each position corresponding to one or more pieces of instruction data included in the guide data and the position of the user terminal. Here, the current state of the user may refer to the state according to the operations performed by the user. For example, the current state of the user may be determined by considering the number of operations performed on the guide data including 10 operations in total. There are various methods of determining whether a certain operation is performed by the user, and it may be determined by considering the position of the user terminal or by detecting a signal received from the transmitting device or the user terminal. For example, when the position of the user terminal is closest to the position of the first instruction data, the current state of the user may be determined first.

Figure 12:
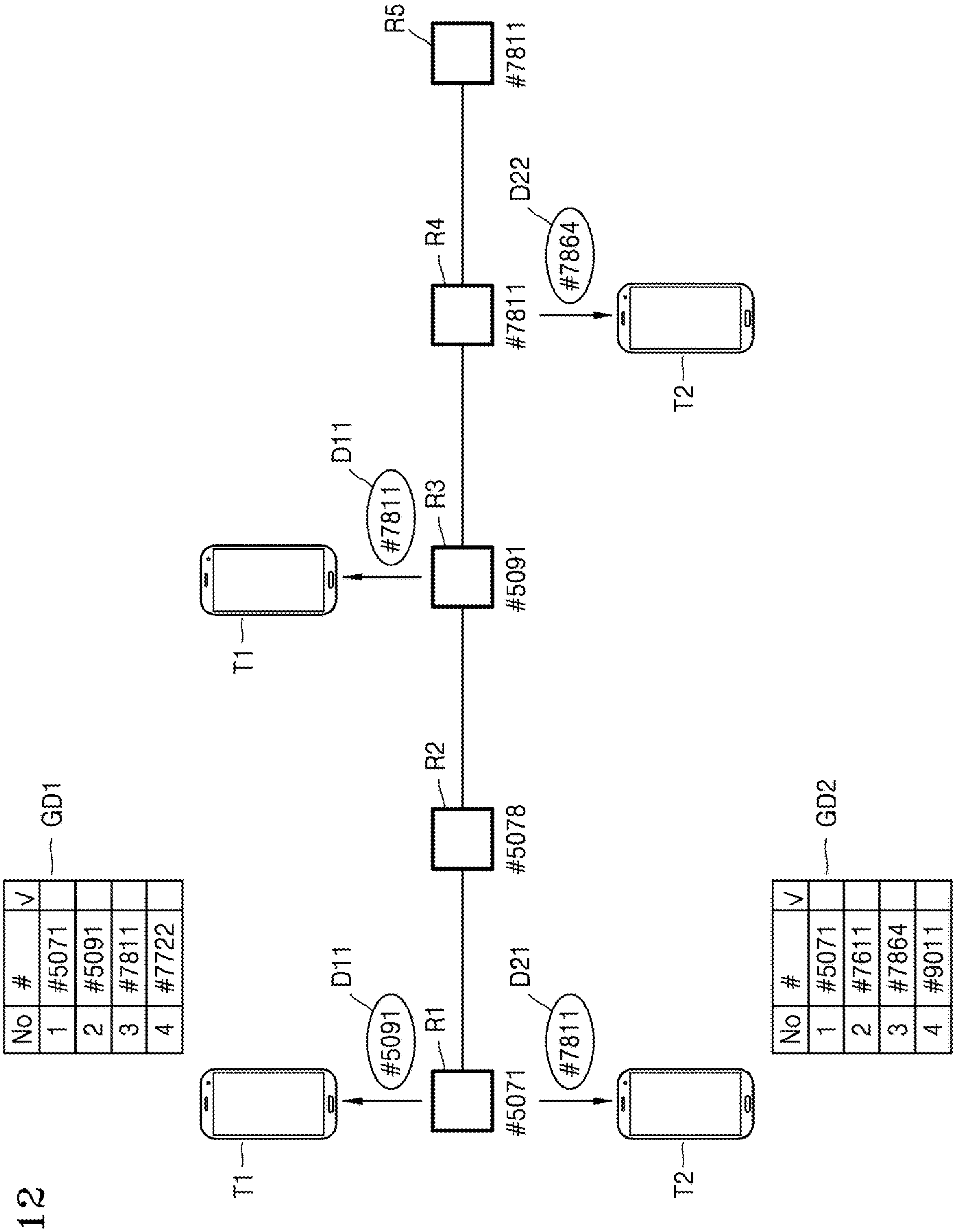
FIG. 12 is a diagram illustrating data communication between a plurality of user terminals and a plurality of transmitting devices.

The procedure managing device 500 may generate instruction data corresponding to the current state of the user (operation S140). The instruction data generating unit 533 may extract and generate instruction data necessary for the user at the current time by considering the position of the user terminal, the preference condition of the user, and/or the guide data. The procedure managing device 500 may generate different instruction data according to the current state of the user. As illustrated in FIG. 12, the procedure managing device 500 may generate first guide data according to a target signal of the first user terminal T1.

The procedure managing device 500 may transmit the instruction data to the transmitting device 800 corresponding to the instruction data (operation S150).

The procedure managing device 500 may determine whether an operation corresponding to the instruction data has been performed (operation S160). As a result of the determination, when the operation corresponding to the instruction data corresponding to the current state is not performed, the procedure managing device 500 may wait for a signal from the user terminal until the operation corresponding to the instruction data is performed (operation S180).

As for operation S160, the procedure managing device 500 may analyze the instruction data and extract the distance between the user terminal (i.e., the performing entity) and the transmitting device corresponding to the operation to be performed, to determine whether the operation corresponding to the instruction data has been performed. Also, the procedure managing device 500 may determine whether the operation corresponding to the instruction data has been performed, through the signal received from one of the user terminal (i.e., the performing entity) corresponding to the instruction data and the transmitting device corresponding to the instruction data.

In this case, when the transmitting device 800 detects a particular user terminal acquired through the received instruction data, it may transmit a certain response signal to the procedure managing device 500 accordingly. That is, the procedure managing device 500 may determine whether the instruction data has been performed, from the response signal received from the transmitting device. In this case, the response signal may include information related to the instruction data.

In another embodiment, when the transmitting device 800 detects a particular user terminal acquired through the received instruction data, it may transmit a certain response signal to the user terminal accordingly. Accordingly, the user terminal that has received the response signal may transmit the response signal to the procedure managing device 500, to determine whether the operation corresponding to the instruction data is performed.

When the operation corresponding to the instruction data corresponding to the current state is performed, the procedure managing device 500 may determine whether all the operations included in the guide data have been performed. The procedure managing device 500 may set the state of the user terminal on which all the operations included in the guide data have been performed to be terminated and stop further procedure guidance.

More particularly, the procedure managing device 500 may determine whether the guide data is completed, by determining whether the position of the user terminal matches the target position of the target signal (operation S170).

Accordingly, for the user who wishes to move to a certain destination by using the public transportation means, the procedure managing method may inform only a subsequent operation considering the present state of the user, instead of providing integrated information directed to the destination. For example, for the user who wants to go to Shinchon by boarding the subway, while providing guide data including an overall procedure for moving to Shinchon, when the user has already purchased a boarding pass or has a pre-purchased transportation pass, it may inform an operation to be performed after the boarding pass purchasing operation. Particularly, the procedure managing device 500 also inform a point corresponding to the subsequent operation, thereby informing in detail a point where the user should actually arrive to perform the subsequent operation.

FIG. 11 is a flowchart illustrating a procedure managing method according to another embodiment of the present disclosure.

Referring to FIG. 11, the procedure managing method according to another embodiment of the present disclosure may include a target signal receiving operation S210, a guide data generating operation S220, a state determining operation S230, an instruction data generating operation S240, an instruction data transmitting operation S250, a response signal receiving operation S260, a state information updating operation S270, and a mission termination status determining operation S280 correspond to a target signal.

The procedure managing device 500 may receive a target signal from the second user terminal (operation S210). The procedure managing device 500 may generate guide data corresponding to the target signal (operation S220). Operations S210 and S220 are the same as operations S110 and S120, and thus redundant descriptions thereof will be omitted.

The procedure managing device 500 may determine the current state of the user by extracting the state information stored in the second user terminal (operation S230). Each user terminal may store state information for indicating an operation performed according to the guide data. The state information may be generated or changed by a controller (processor) included in the user terminal, or may be generated or changed by the procedure managing device 500.

The procedure managing device 500 may generate instruction data corresponding to the current state (operation S240). The procedure managing device 500 may transmit the instruction data to the second user terminal (operation S250).

The procedure managing device 500 may determine whether a response signal to the instruction data is received (operation S260). When the operation included in the instruction data has been performed, the second user terminal receiving the instruction data may generate a response signal to the instruction data and transmit the response signal to the procedure managing device 500. A method of determining whether the operation included in the instruction data has been performed may be determined by #target included in the instruction data. That is, when receiving a signal including #target included in the instruction data from the transmitting device, the second user terminal may determine that the operation corresponding to the instruction data has been performed. The signal including #target may be received from the transmitting device corresponding to #target. The transmitting device may operate such that it transmits its own identification information at a certain time period and does not receive any response.

As a result of the determination, upon receiving the response signal to the instruction data, the procedure managing device 500 may update the state information of the second user terminal (operation S270). The procedure managing device 500 may transmit a request for updating the state information of the second user terminal to the second user terminal and may transmit a request for changing data of a certain region of the second user terminal, that is, a region where the state information is stored. As a result of the determination, when not receiving a response signal to the instruction data, the procedure managing device 500 may wait for a response signal (operation S290).

When the state information of the second user terminal corresponds to "termination", the procedure managing device 500 may determine that the process for the target signal has been completed.

When the state information of the second user terminal does not correspond to "termination", the procedure managing device 500 may return to operation S240 to repeat operation S240.

As illustrated in FIG. 12, the procedure managing device 500 may generate guide data corresponding to operations to be performed by each user in response to the target signal received from each user terminal. The procedure managing device 500 may transmit first guide data GD1 to the first user terminal T1 in response to the target signal of each user and transmit second guide data GD2 to the second user terminal T2.

The first guide data GD1 may include instruction data of four steps according to the target signal received from the first user terminal T1. That is, according to the first guide data, the procedure managing device 500 may sequentially transmit first instruction data #5071, second instruction data #5091, third instruction data #7811, and fourth instruction data #7722 such that the first user may arrive at a desired destination. By considering the current state of the first user terminal T1, the procedure managing device 500 may transmit the first instruction data to the first user terminal T1. Accordingly, the first user terminal T1 may detect the first transmitting device R1 corresponding to the first instruction data based on the information acquired from the first instruction data. As the first user terminal T1 detects the first transmitting device R1, the current state of the first user terminal T1 may change into the next step.

In another embodiment, the procedure managing device 500 may transmit the first instruction data to the first transmitting device #5071. Accordingly, the first transmitting device #5071 may wait for the approach of the first user terminal T1. Upon receiving a certain request signal from the first user terminal, the first transmitting device #5071 may determine that an operation corresponding to the first instruction data has been performed, and transmit the corresponding signal to the procedure managing device 500.

The procedure managing device 500 may analyze the signal, the position, or the like from the first user terminal T1 to determine whether the first instruction data is completed or the current state, and transmit the second instruction data #5091 to the first user terminal T1 based on the current state of the first user. As described above, the second instruction data #5091 may be transmitted to the second transmitting device #5091. When it is determined that the operation corresponding to the second instruction data #5091 has been performed, the procedure managing device 500 may transmit the first guide data GD1 for the first user terminal T1 and the third instruction data #7811 according to the current state of the first user.

When all the operations included in the guide data GD1 for the first user have been performed, the procedure managing device 500 may store and manage the guide data and the target signal by determining that they have all been processed.

The second guide data GD2 may include instruction data of four steps according to the target signal received from the second user terminal T2. That is, according to the second guide data GD2, the procedure managing device 500 may sequentially transmit first instruction data #5071, second instruction data #7811, third instruction data #7864, and fourth instruction data #9011 such that the second user may arrive at a desired destination. By considering the current state of the second user terminal T2, the procedure managing device 500 may transmit the first instruction data to the second user terminal T2. Accordingly, the second user terminal T2 may detect the first transmitting device R1 corresponding to the first instruction data based on the information acquired from the first instruction data #5071. As the second user terminal T2 detects the first transmitting device R1, the current state of the second user terminal T2 may change into the next step.

In another embodiment, the procedure managing device 500 may transmit the first instruction data to the first transmitting device #5071. Accordingly, the first transmitting device #5071 may wait for the approach of the second user terminal T2. Upon receiving a certain request signal from the second user terminal T2, the first transmitting device #5071 may determine that an operation corresponding to the first instruction data has been performed, and transmit the corresponding signal to the procedure managing device 500.

The procedure managing device 500 may analyze the signal, the position, or the like from the second user terminal T2 to determine whether the first instruction data is completed or the current state, and transmit the second instruction data #7811 to the second user terminal T2 based on the current state of the second user. As described above, the second instruction data #7811 may be transmitted to the second transmitting device #7811. When it is determined that the operation corresponding to the second instruction data #7811 has been performed, the procedure managing device 500 may transmit the second guide data GD2 for the second user terminal T2 and the third instruction data #7864 according to the current state of the second user.

When all the operations included in the guide data GD2 for the second user have been performed, the procedure managing device 500 may store and manage the second guide data and the target signal by determining that they have all been processed.

Meanwhile, as described above, the transmitting device 800 may be a device installed together in a facility. In an embodiment, the facility may be a structure in a space that may affect the movement of a user, such as a boarding pass issuing machine existing at a location where a boarding pass is issued, a door at an entrance, an elevator, a column, etc. Since the transmitting device 800 is given a unique identification number, the instruction data generating unit 533 may identify, based on the response signal received from the transmitting device 800, the structure in which the corresponding transmitting device is installed.

According to an embodiment, the transmitting device 800 may communicate with the user terminal 600 by using a short-range wireless communication network (Bluetooth, beacon, NFC, etc.). In addition, since the transmitting device 800 is installed in the facility, in an embodiment of the present invention, the signal transmission possible distance of the transmitting device 800 may be within a certain radius from the facility. Therefore, when the user terminal 600 approaches within a certain radius from the structure, the transmitting device 800 may identify the location of the user terminal 600 or detect the approach. In addition, the instruction data generating unit 533 may calculate the distance between the transmitting device 800 and the user terminal 600 based on the signal from the transmitting device 800, and determine whether an operation corresponding to the instruction data is performed, and subsequent instruction data may be generated according to the determination result. Additionally, when the distance between the facility and the user terminal 600 is less than or equal to a preset value, the instruction data generating unit 533 may generate instruction data including a facility guide signal, and may transmit the same to the transmitting device 800 corresponding to the facility.

Figure 13:
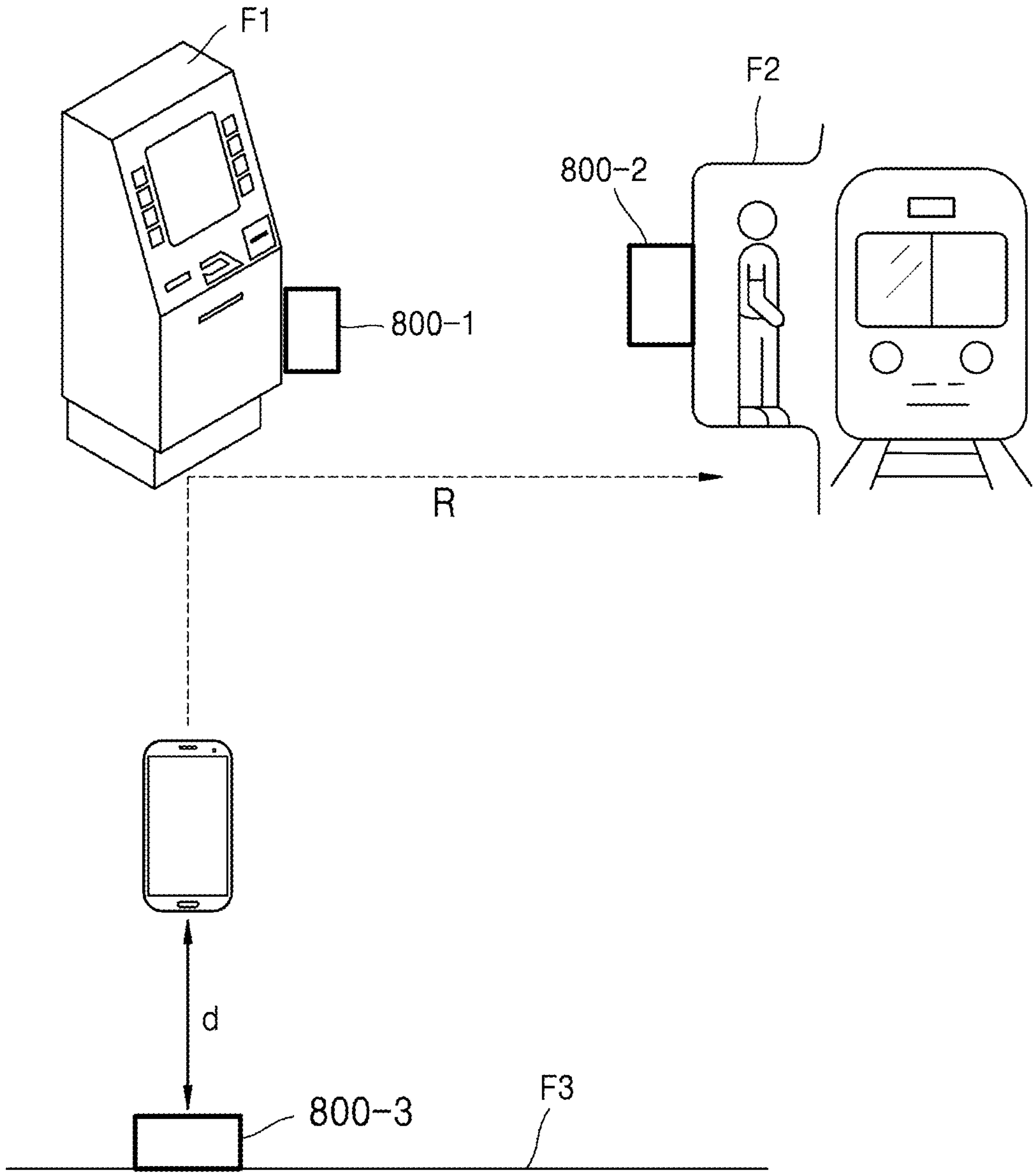
FIG. 13 is a diagram illustrating a guide data generation method using a user terminal and a plurality of transmitting devices.

FIG. 13 shows a view to explain a guide data generation method using a user terminal and a plurality of transmitting devices.

Referring to FIG. 13, a plurality of transmitting devices 800-1, 800-2, and 800-3 may be installed in corresponding facilities F1, F2, and F3, respectively. In an embodiment, the user terminal 600 may generate a target signal for moving to the boarding place according to a user's input and transmit the same to the procedure managing device 500. The procedure managing device 500 may issue a ticket at the facility F1 corresponding to the ticketing machine based on the target signal and may generate a guide signal including a path R moving to the facility F2 corresponding to the boarding place. In addition, the procedure managing device 500 may generate, based on the guide signal, instruction data indicating such that the location of the user terminal can move to the facility F2 through the facility F1, and transmit the same to the transmitting device 800-1 and the transmitting device 800-2. Meanwhile, the facilities may further include, in addition to the facilities F1 and F2, which are related to the user's movement path, the facility F3, which is an obstacle on the user's movement path. Examples of the facility F3 are walls, columns, and guide signs. According to an embodiment, the transmitting device 800-3 is installed in the facility F3, which is an obstacle, and the procedure managing device 500 may transmit instruction data related to the facility F3, which is an obstacle, to the transmitting device 800-3. When the distance d between the user terminal 600 and the transmitting device 800-3 is less than or equal to a preset value, the procedure managing device 500 may generate, based on the location of the user terminal, instruction data including a facility guide signal, and may transmit the same to the transmitting device 800-3 corresponding to the facility F3. Based on the instruction data, when the distance d is less than or equal to a preset value, the transmitting device 800-3 may transmit, to the user terminal 600, a collision warning or detour signal together with a guide signal indicating that an obstacle exists.

Particular implementations described herein are merely embodiments, and do not limit the scope of the present disclosure in any way. For the sake of conciseness, descriptions of related art electronic configurations, control systems, software, and other functional aspects of the systems may be omitted. Also, the connection lines or connection members between various components illustrated in the drawings represent examples of functional connections and/or physical or logical connections between the various components, and various alternative or additional functional connections, physical connections, or logical connections may be present in practical apparatuses. Also, no element may be essential to the practice of the present disclosure unless the element is specifically described as "essential" or "critical".

The use of the terms "a", "an", and "the" and similar referents in the context of the specification (especially in the context of the following claims) may be construed to cover both the singular and the plural. Also, recitation of a range of values herein are merely intended to serve as a shorthand method of referring individually to each separate value falling within the range, unless otherwise indicated herein, and each separate value is incorporated into the specification as if it was individually recited herein. Also, the operations of the method described herein may be performed in any suitable order unless otherwise indicated herein or otherwise clearly contradicted by the context. The scope of the present disclosure is not limited to the above-described operation order. All examples or example terms (e.g., "such as") provided herein are merely used to describe the present disclosure in detail, and the scope of the present disclosure is not limited by the examples or example terms unless otherwise claimed. Also, those of ordinary skill in the art will readily understand that various modifications and combinations may be made according to design conditions and factors without departing from the spirit and scope of the present disclosure as defined by the following claims.

The above embodiments of the present disclosure may be embodied in the form of program commands executable through various computer components, which may be recorded on a computer-readable recording medium. The computer-readable recording medium may include program commands, data files, and data structures either alone or in combination. The program commands recorded on the computer-readable recording medium may be those that are especially designed and configured for the present disclosure, or may be those that are known and available to computer programmers skilled in the art. Examples of the computer-readable recording mediums may include magnetic recording mediums such as hard disks, floppy disks, and magnetic tapes, optical recording mediums such as CD-ROMs and DVDs, magneto-optical recording mediums such as floptical disks, and hardware devices such as ROMs, RAMs and flash memories that are especially configured to store and execute program commands. Examples of the program commands may include machine language codes that may be generated by a compiler, and high-level language codes that may be executed by a computer by using an interpreter. The hardware device may be modified into one or more software modules to perform a process according to the present disclosure, and vice versa.

Although the present disclosure has been described above with reference to the drawings, certain embodiments, and particular features such as particular component, this is merely provided to promote a more comprehensive understanding of the present disclosure, the present disclosure is not limited to the above embodiments, and those of ordinary skill in the art may made various modifications therein.

Thus, the spirit of the present disclosure is not limited to the above embodiments, and the scope of the present disclosure may include both the following claims and the equivalents thereof.

INDUSTRIAL APPLICABILITY

The present disclosure relates to boarding information guiding systems and methods.

The invention claimed is:

1. A procedure managing method comprising:

receiving, by a procedure managing device, a target signal from a user terminal;

generating guide data corresponding to a target position extracted by analyzing the target signal;

generating at least one piece of instruction data by considering a position of the user terminal, a preference condition of a user, and guide data;

reading state information stored in the user terminal and analyzing the state information to extract first instruction data corresponding to an operation to be performed at a current time;

transmitting the first instruction data to the user terminal and waiting for a response signal from the user terminal; and when a response signal is received from the user terminal, extracting second instruction data corresponding to a subsequent operation of the first instruction data and transmitting the second instruction data to the user terminal.

2. The procedure managing method of claim 1, further comprising terminating guide data corresponding to the target signal when a response signal is received from the user terminal and there is no subsequent instruction data of the first instruction data through state information acquired by analyzing the response signal.

3. The procedure managing method of claim 1, wherein, when failing to read state information from the user terminal, the extracting of the first instruction data analyzes a position of the user terminal or a latest response signal received in response to a target signal of the user terminal, to extract first instruction data corresponding to an operation to be performed at a current time.

4. The procedure managing method of claim 1, wherein, when failing to receive the response signal within a preset threshold time from a time of transmitting the first instruction data, the waiting for the response signal from the user terminal transmits the first instruction data and path information reaching a transmitting device corresponding to the first instruction data to the user terminal and wait for a response signal from the user terminal.

5. The procedure managing method of claim 1, wherein the response signal is generated by the user terminal according to detection of approach to a first transmitting device extracted by the first instruction data.

6. A procedure managing device comprising:

a target signal receiving unit receiving at least one target signal from at least one user terminal;

a guide data generating unit generating guide data corresponding to a target position extracted by analyzing the at least one target signal; and an instruction data generating unit generating instruction data corresponding to an operation to be performed at a current time, by considering a position of each user terminal, a preference condition of each user, and guide data for each user, and transmitting instruction data to each user terminal or a transmitting device corresponding to the instruction data.

7. The procedure managing device of claim 6, further comprising a state managing unit managing state information of each user and updating state information of the user when a response to the instruction data is received from the transmitting device or the user terminal.

8. The procedure managing device of claim 7, wherein, when a response signal to the instruction data is received from the transmitting device, the state managing unit updates the state information of the user through the response signal received from the transmitting device, and when a response signal to the instruction data is received from the user terminal, the state managing unit updates the state information of the user through the response signal received from the user terminal.

9. The procedure managing device of claim 6, wherein the transmitting device is installed together with a facility, and the facility is a spatial structure that influences movement of the user.

10. The procedure managing device of claim 9, wherein the instruction data generating unit is configured to receive a response signal from the transmitting device, calculate a distance between the transmitting device and the user terminal based on the received response signal, determine whether an operation corresponding to the instruction data has been performed, and generate subsequent instruction data based on the determination result.

11. The procedure managing device of claim 10, wherein the instruction data generating unit is configured to identify the facility in which the transmitting device is installed based on the response signal received from the transmitting device.

12. The procedure managing device of claim 10, wherein the instruction data generating unit is configured to generate instruction data including a facility guide signal and transmit the instruction data to the transmitting device when the distance between the user terminal and the transmitting device is less than or equal to a preset value.

* * * * *